(12) United States Patent
Okada et al.

(10) Patent No.: US 6,471,131 B2
(45) Date of Patent: Oct. 29, 2002

(54) MEMORY CARD AND CARD SOCKET

(75) Inventors: Teruo Okada, Gunma-ken; Shintaro Ito, Kanagawa-ken, both of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/795,103

(22) Filed: Mar. 1, 2001

(65) Prior Publication Data

US 2002/0014535 A1 Feb. 7, 2002

(30) Foreign Application Priority Data

Mar. 20, 2000 (JP) ........................................ 2000-057713
Feb. 16, 2001 (JP) ........................................ 2001-040099

(51) Int. Cl.[7] .............................................. G06K 19/06
(52) U.S. Cl. ........................ 235/492; 369/289; 206/307; 235/493
(58) Field of Search ................................ 235/486, 492, 235/495, 482, 451; 361/737, 752

(56) References Cited

U.S. PATENT DOCUMENTS 3,612,955 A * 10/1971 Butherus ................. 317/101 A
5,117,415 A * 5/1992 Ohta ........................... 369/271
5,451,763 A * 9/1995 Pickett ........................ 235/492
5,619,660 A * 4/1997 Scheer ........................ 395/282
5,751,688 A * 5/1998 Mizuno ....................... 369/270
5,949,317 A * 9/1999 Fink et al. ................... 335/305
6,145,191 A * 11/2000 Baldwin ....................... 29/840

FOREIGN PATENT DOCUMENTS

EP         000924972 A2 * 6/1999 ........... H01R/23/72
JP         5-189624           7/1993
JP         9-232695           9/1997

* cited by examiner

Primary Examiner—Michael G. Lee
Assistant Examiner—Daniel Hess
(74) Attorney, Agent, or Firm—Oblon, Spivak, McClelland, Maier & Neustadt, P.C.

(57) ABSTRACT

In a card socket (21-1) having a socket body (21) in which a memory card (10-1) is set and socket electrodes (22) formed on a bottom surface of the socket body (21) to be electrically contacted to exposed electrodes (12) of the memory card (10-1) when set into the card socket (21-1), the memory card (10-1) is magnetically contacted and fixed to the bottom surface of the socket body (21). The card socket (21-1) further has a card removal button (24) for releasing the memory card (10-1) from the card socket (21-1).

17 Claims, 21 Drawing Sheets

MEMORY CARD AND CARD SOCKET

CROSS-REFERENCE TO RELATED APPLICATION

This application claims benefit of priority under 35 USC 119 to Japanese Patent Applications No. 2000-57713, filed Mar. 2, 2000 and No. 2001-40099, filed Feb. 16, 2001; the entire contents of which are incorporated herein by reference.

BACKGROUND OF THE INVENTION

1. Field of the Invention

The present invention relates to a memory card such as a smart media and the like, and also to a card socket in which the memory card is set.

2. Description of the Related Art

For example, memory cards such as a smart media and the like, in which music information coded in compressed filed are stored, become widespread.

FIGS. 1A and 1B are diagrams showing a configuration of a conventional memory card. In particular, FIG. 1A is a plan view of the conventional memory card, and FIG. 1B is a sectional view thereof.

This conventional memory card 100 comprises a card-type holder 101 made of resin. In the card-type holder 101, a memory device module 103 comprising a flash memory chip is embedded. A plurality of external electrodes 102 of a plane type in the memory device module 103 are formed on the back side of the card-type holder 101.

FIG. 2 is a diagram showing a configuration of a conventional card socket in which the memory card 100 shown in FIGS. 1A and 1B is inserted and then set.

This conventional card socket, incorporated in a main device, comprises a socket box 111 having a card insertion section 111a with an opening section through which the memory card 100 is inserted. A plurality of spring electrodes 112 electrically connected to the main device are formed at the bottom side of the front stopper section 111b in the socket box 111.

Next, a description will be given of the mechanism of insertion of the memory card to and removal of the memory card from the card socket described above with reference to FIGS. 3A to 3E.

In the insertion of the memory card 100 into the card socket, the user first inserts the memory card 100 into the card insertion section 111a (see FIGS. 3A and 3B). Then, when the memory card 100 comes into contact with the front stopper section 111b in the socket box 111, the external electrodes 102 of a plane type in the memory card 100 are fastened on the spring electrodes 112 in the card socket side with a strong spring mechanism (see FIG. 3C).

In the removal of the memory card from the card socket, the user grasps the end of the memory card 100 that is out of the card insertion section 111a, and then pulls the memory card 100 in the opposite direction to the insertion direction. The removal of the memory card 100 from the card socket is thereby completed (see FIGS. 3D and 3E).

However, in the configuration of both the conventional memory card and the conventional card socket, the spring electrodes 112 in the card socket have a strong force in order to fasten the external electrodes 102 in the memory card 100 to the spring electrodes 112 in the card socket. Thereby, both the electrodes 102 and 112 are strongly fixed to each other. Accordingly, the resistance becomes large during the insertion of the memory card 100 to the card socket and also during the removal of the memory card 100 from the card socket. This introduces the difficulty of the insertion of the memory card 100 to the card socket and of the removal of it from the card socket smoothly.

In particularly, when a main device equipped with the card socket is relatively light in weight, it is necessary for the user to hold the main device with the disengaged hand, and to grasp the memory card 100 with other hand. The user feels very inconvenience in the use of the conventional memory card and the conventional card socket.

SUMMARY OF THE INVENTION

Accordingly, an object of the present invention is, with due consideration to the drawbacks of the conventional technique, to provide a memory card and a card socket capable of easily handling the insertion of the memory card to the card socket and the removal of the memory card from the card socket.

In accordance with a preferred embodiment of the present invention, a memory card comprises a card type holder and a memory device module embedded in the card type holder. The card type holder comprises a semiconductor memory device whose external electrodes are exposed on one surface of the memory device module. In this memory card, at least one of a part of the card type holder and the external electrodes are made of a ferromagnetic material.

In addition, in the memory card of the present invention described above, the ferromagnetic material is made up of a permanent magnet, and the permanent magnet is covered with a magnet shield material.

Furthermore, in the memory card of the present invention described above, the ferromagnetic material is made up of a ferromagnetic material of a plate shape adhered on a part of the card type holder.

In accordance with another preferred embodiment of the present invention, a memory card comprises a card type holder and a memory device module embedded in the card type holder. The memory device module comprises a semiconductor memory device whose external electrodes are exposed on one surface of the memory device module. In this memory card, at least one of a part of the card type holder and the external electrodes are made of an electromagnet.

In addition, in the memory card of the present invention described above, the electromagnet is covered with a magnet shield material.

In accordance with another preferred embodiment of the present invention, a card socket comprises a socket body in which a memory card is set and socket electrodes formed on a bottom surface of the socket body to be electrically contacted to exposed electrodes of the memory card when the memory card is set into the card socket. In this card socket, at least a part of a bottom surface of the socket body and the socket electrodes are made of ferromagnetic material.

Furthermore, in the memory card of the present invention described above, the ferromagnetic material is made of a permanent magnet, and the permanent magnet is covered with a magnet shield material.

In accordance with another preferred embodiment of the present invention, a card socket comprises a socket body in which a memory card is set and socket electrodes formed on a bottom surface of the socket body to be electrically contacted to exposed electrodes of the memory card when the memory card is set into the card socket. In this card socket, at least a part of a bottom surface of the socket body and the socket electrodes are made of an electromagnet.

Furthermore, in the card socket of the present invention described above, the electromagnet is covered with a magnet shield material.

In accordance with another preferred embodiment of the present invention, a card socket comprises a socket body in which a memory card is set and socket electrodes formed on a bottom surface of the socket body to be electrically contacted to exposed electrodes of the memory card when the memory card is set into the card socket. In this card socket, the memory card is strongly contacted and fixed to the bottom surface of the socket body by a magnetic force.

In addition, in the card socket of the present invention described above, the memory card is one of the memory cards of the present invention, and this memory card is contacted and fixed to the socket body by the magnetic force of both the socket body and the memory card.

The card socket of the present invention described above further comprises a fixed card releasing mechanism for releasing the memory card in a fixed state from the card socket by pushing up the memory card.

The card socket of the present invention described above further comprises a fixed card releasing mechanism for releasing the memory card in a magnetically fixed state from the card socket by inserting a low permeability material.

The card socket of the present invention described above further comprises a fixed card releasing mechanism for releasing the memory card in a magnetically fixed state from the card socket by inserting a magnetic shield material.

In the card socket of the present invention described above, at least one of the socket body and the memory card has a magnetic force whose magnitude is only a degree that the memory card can be inserted into the socket body without any additional force when the memory card is close to a card insertion section of the socket body.

Moreover, in the card socket of the present invention described above, the socket electrodes are formed on the bottom surface of the socket body in an exposed state, and the socket electrodes act as spring electrodes against the exposed electrodes of the memory card when the memory card is set in the card socket completely.

Still furthermore, in the card socket of the present invention described above, the socket body is one of a box form and a half box form in which one surface of the half box form is an opening.

Moreover, the card socket of the present invention described above is so used that the card socket is mounted as an external interface into a sound system and the socket electrodes in the card socket are electrically connected to a data input mechanism of the sound system for inputting data from the memory card.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 1A is a plan view of the conventional memory card and FIG. 1B is a sectional view thereof;

DESCRIPTION OF THE PREFERRED EMBODIMENTS

Other features of this invention will become apparent through the following description of preferred embodiments which are given for illustration of the invention and are not intended to be limiting thereof.

First Embodiment

Figure 1A:
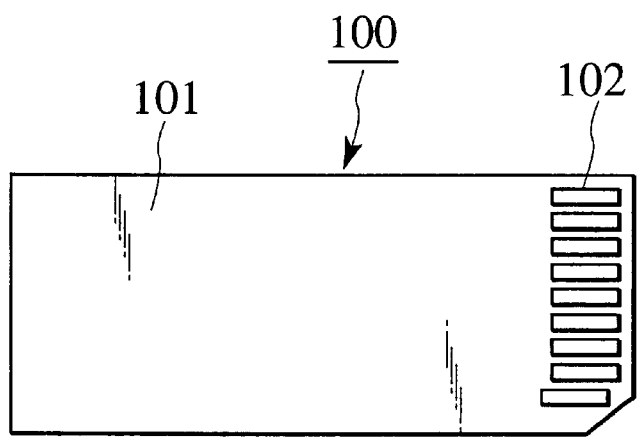
FIGS. 1A and 1B are diagrams showing a configuration of a conventional memory card, in particularly.
Figure 1B:
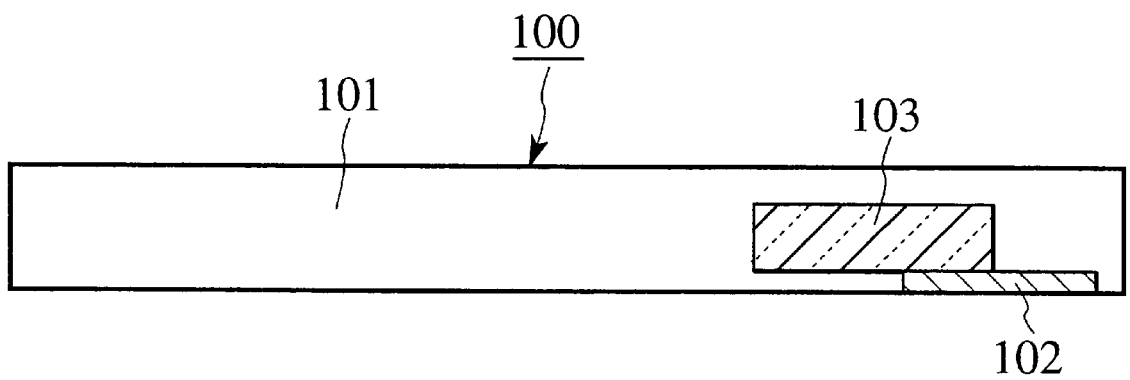
Figure 2:
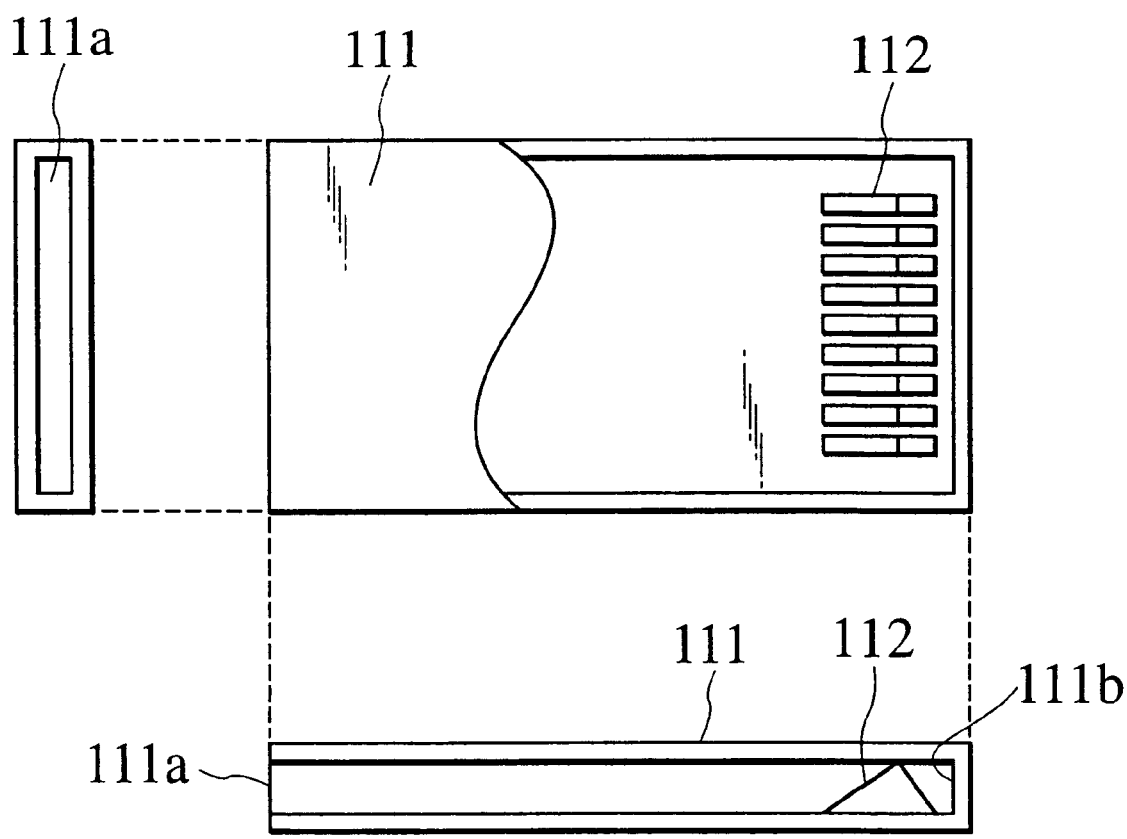
FIG. 2 is a diagram showing a configuration of a conventional card socket in which the memory card shown in FIGS. 1A and 1B is inserted.
Figure 3A:
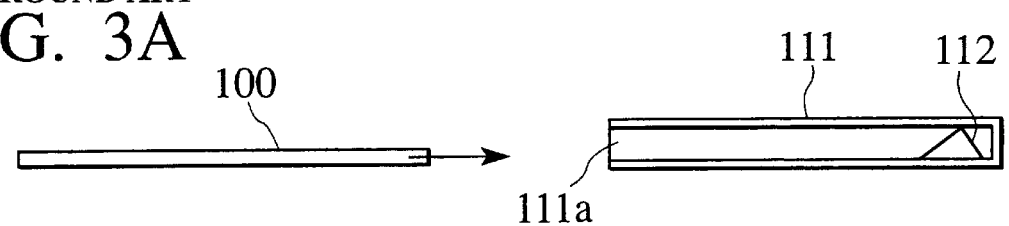
FIGS. 3A to 3E are diagrams for explaining a mechanism of insertion and removal of the conventional memory card.
Figure 3B:
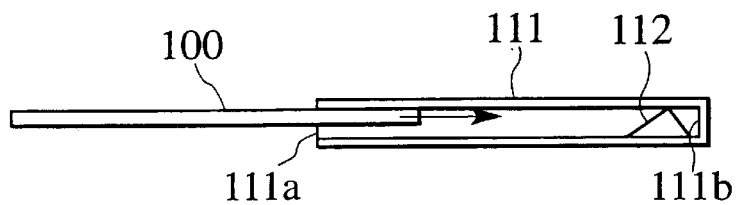
Figure 3C:
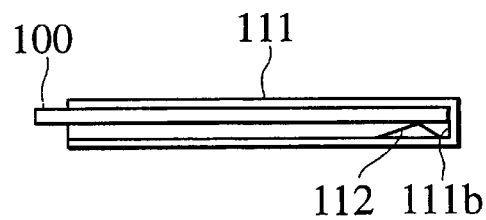
Figure 3D:
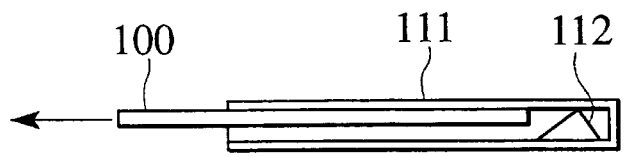
Figure 3E:
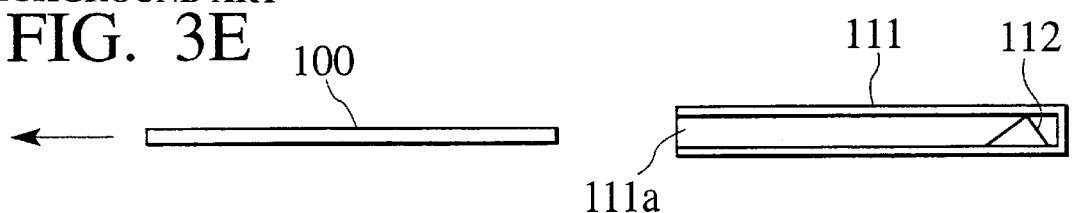
Figure 4A:
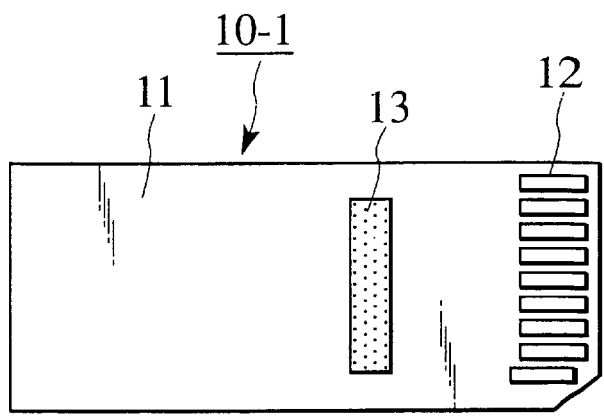
FIGS. 4A to 4C are diagrams showing a configuration of a memory card according to the first embodiment of the present invention.
Figure 4B:
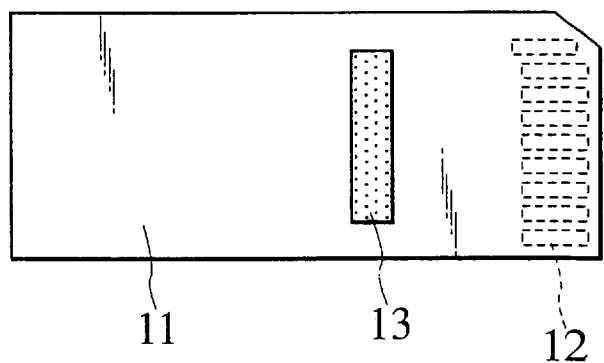
Figure 4C:
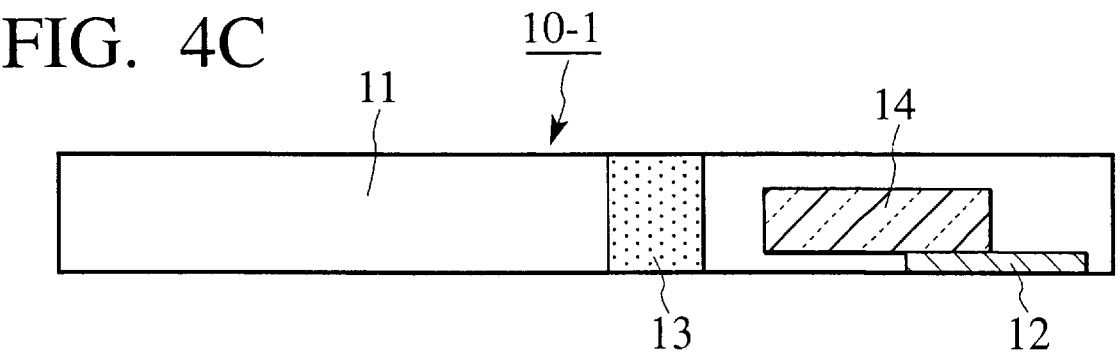

FIGS. 4A, 4B, and 4C are diagrams showing a configuration of the memory card according to the first embodiment of the present invention. In particularly, FIG. 4A is a plan view of the electrode side of the memory card, FIG. 4B is a plan view of the back side of the memory card shown in FIG. 4A where no electrode is formed, and FIG. 4C is a sectional view of the memory card.

The memory card 10-1 of the first embodiment has a card-type holder 11 of a small size made of plastic. A memory device module comprising a flash memory chip is formed in the card-type holder 11. A plurality of external electrodes 12 of a plane type in the memory device module 14 are exposed near the top section of the back side of the card-type holder 11. A rectangle magnet 13, for example, made of a permanent magnet, along the direction of the arrangement of the external electrodes 12 of the plane type is placed at the middle section of the card-type holder 11. It is, of course, possible to have the memory device module including an interface circuit with the flash memory.

Figure 5:
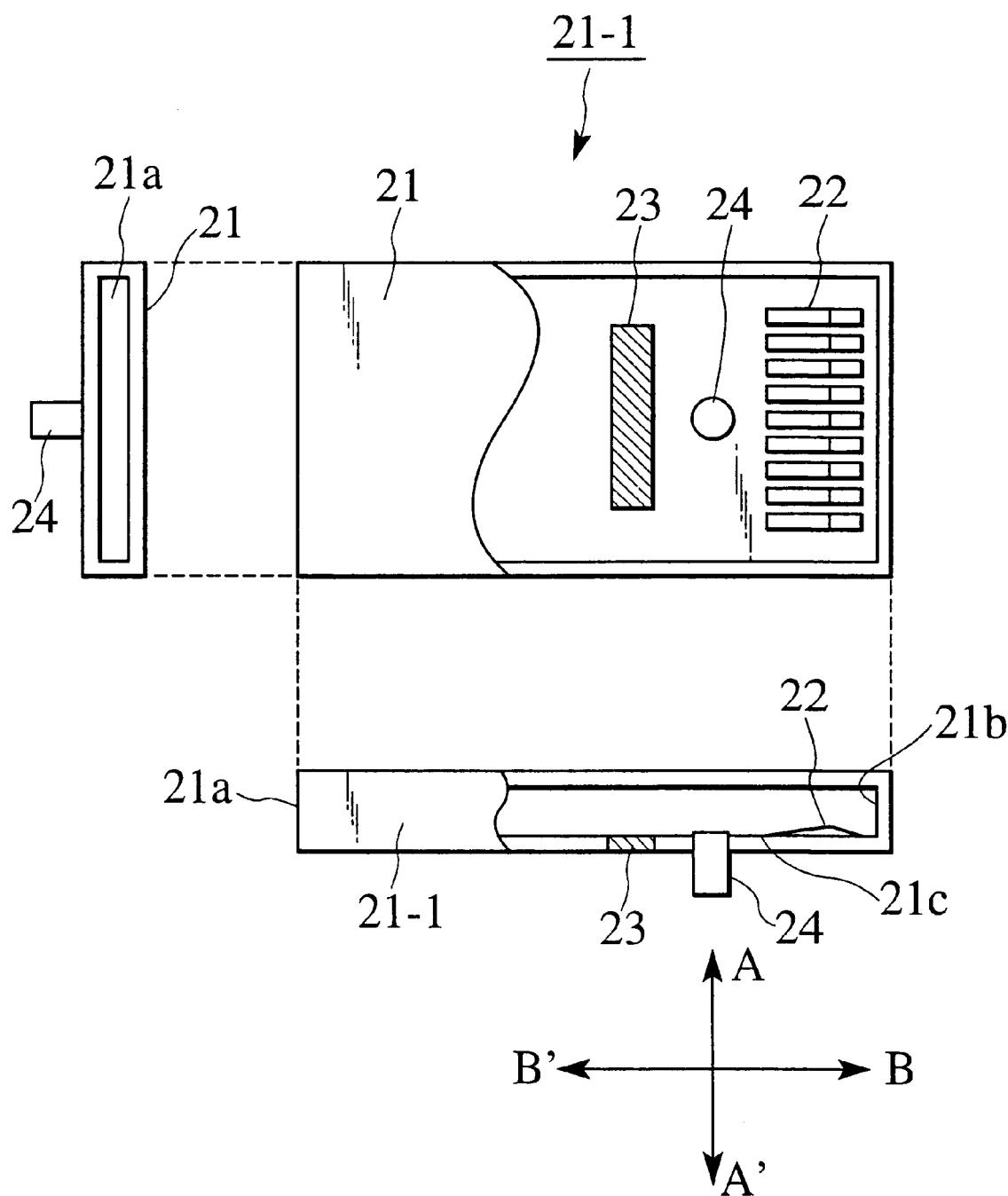
FIG. 5 is a diagram showing a configuration of a card socket according to the first embodiment of the present invention.

FIG. 5 is a diagram showing a configuration of the card socket according to the first embodiment of the present invention. This card socket 21-1 shown in FIG. 5 is used together with the memory card 10-1 of the configuration shown in FIGS. 4A to 4C.

This card socket 21-1 shown in FIG. 5 comprises a socket body 21 of a rectangle shape having a card insertion section (the opening section) 21a through which the memory card 10-1 is inserted and then removed (along the direction B and B' in FIG. 5). On the bottom surface of the front stopper section 21b of the card socket 21-1, a plurality of spring electrodes 22 are formed in regular arrangement (arranged in array). The spring electrodes 22 are connected electrically to a main device (omitted from FIG. 5, to which this card socket 21-1 is attached). Each spring electrode 22 is so formed that the spring force thereof is weaker than that of each spring electrode in the conventional card socket.

A magnet 23 is formed at the middle area in the bottom section of the card socket 21-1. The position of this magnet 23 corresponds to the position of the magnet 13 in the memory card 10-1, and the shape of the magnet 23 is the same as that of the magnet 13 in the memory card 10-1. A card removal button 24 of a bar shape for removing the memory card 10-1 is penetrated through the bottom surface 21c of the card socket 21-1 that is near the middle section between the magnet 23 and the spring electrodes 22. The card removal button 24 is reciprocally moved (A–A' in FIG. 5), whose direction A–A' is the vertical direction to the movement direction (B–B' in FIG. 5) of the memory card 10-1.

Next, a description will be given of the mechanism of insertion and removal of the memory card 10-1 to the card socket 21-1 with reference to FIGS. 6A to 6F.

FIGS. 6A to 6F are diagrams for explaining the mechanism of insertion and removal of the memory card 10-1 and the card socket 21-1 according to the first embodiment of the present invention.

Figure 6A:
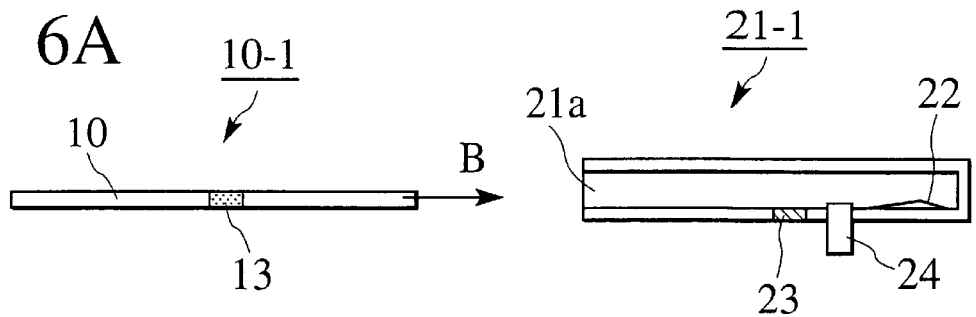
FIGS. 6A to 6F are diagrams for explaining a mechanism of insertion and removal of the memory card and the card socket according to the first embodiment of the present invention.
Figure 6B:
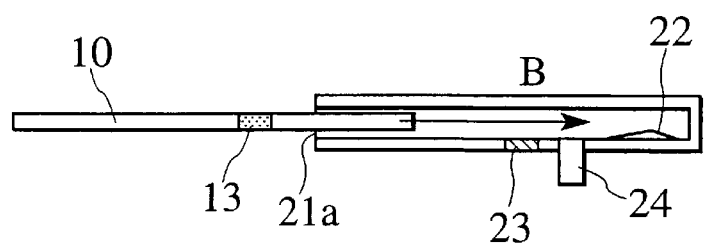
Figure 6C:
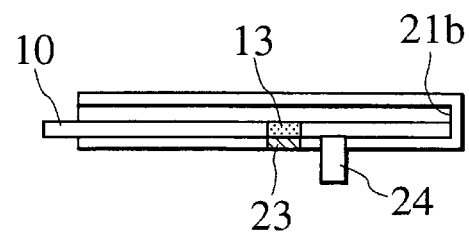

In the insertion of the memory card 10-1 to the card socket 21-1, firstly, the card removal button 24 in the card socket 21-1 is pulled back to the ready position (or the standby position, see FIG. 6A). Then, the user inserts the memory card 10-1 from the external electrodes 12 side thereof through the card insertion section 21a of the card socket 21-1 along the correct direction B (see FIG. 6B) until the front section of the memory card 10-1 is reached to the front stopper section 21b in the card socket 21-1. In this embodiment, it is possible for the user to insert the memory card 10-1 easily with a weak force into the card socket 21-1 because the spring force of each spring electrode 22 in the card socket 21-1 is weak. As soon as the insertion of the memory card 10-1 to the card socket 21-1 is completed, the magnets 13 and 23 in both the memory card 10-1 and the card socket 21-1 attract each other. Accordingly, it is easily possible to perform the positioning of the memory card 10-1 in the card socket 21-1 and to contact both the electrodes 12 and 22 thereof correctly (see FIG. 6C).

Figure 6D:
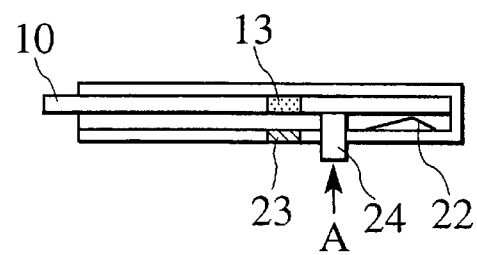
Figure 6E:
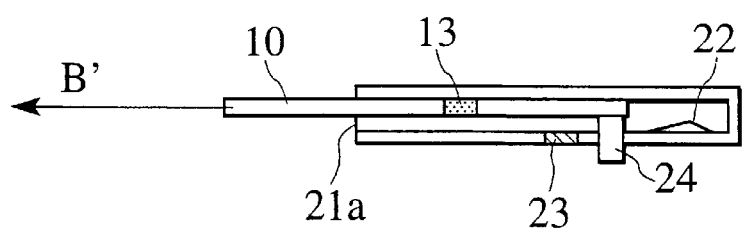
Figure 6F:
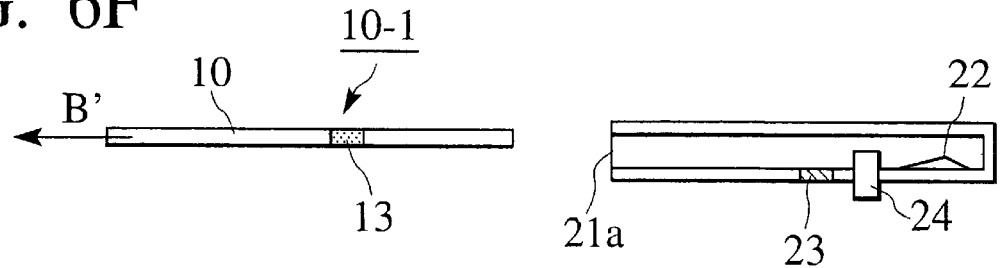

On the other hand, in the removal of the memory card 10-1 from the card socket 21-1, as shown in FIG. 6D, when the user pushes the card removal button 24 in the direction A, the memory card 10-1 is thereby pushed up from the bottom surface 21c of the card socket 21-1, so that the memory card 10-1 is released from the fixed state because both the magnets 13 and 23 are separated to each other, so that the magnetic force between them becomes weak. That is, it is possible for the user to remove the memory card 10-1 from the card socket 21-1 easily with a weak force (see FIGS. 6E and 6F).

As described above, according to the first embodiment of the present invention, it is possible for the user to insert the memory card into and to remove it from the card socket smoothly with a weak force.

Second Embodiment

In the configuration of the first embodiment described above, the card removable button 24 has been still left in the pushed state even if the removal of the memory card 10-1 from the card socket 21-1 is completed. When the user wants to insert the memory card 10-1 again or another memory card to the card socket 21-3, it is necessary to pull back the card removal button 24. The second embodiment of the present invention provides the configuration of the card socket 21-2 capable of eliminating the above operation to pull back the card removal button 24, that is, to pull back the card removal button 24.

Figure 7A:
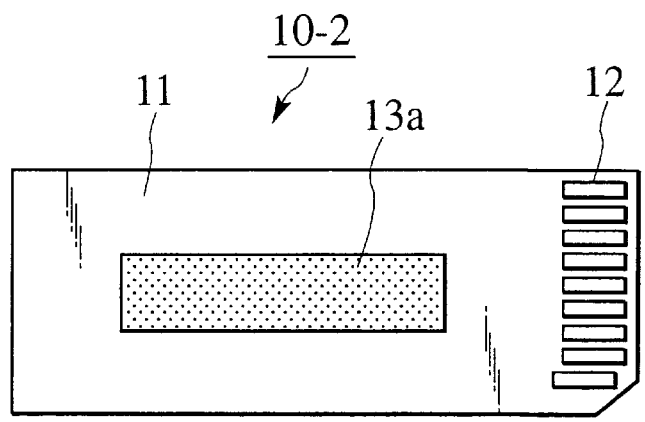
FIGS. 7A and 7B are diagrams showing a configuration of a memory card and a card socket according to the second embodiment of the present invention.
Figure 7B:
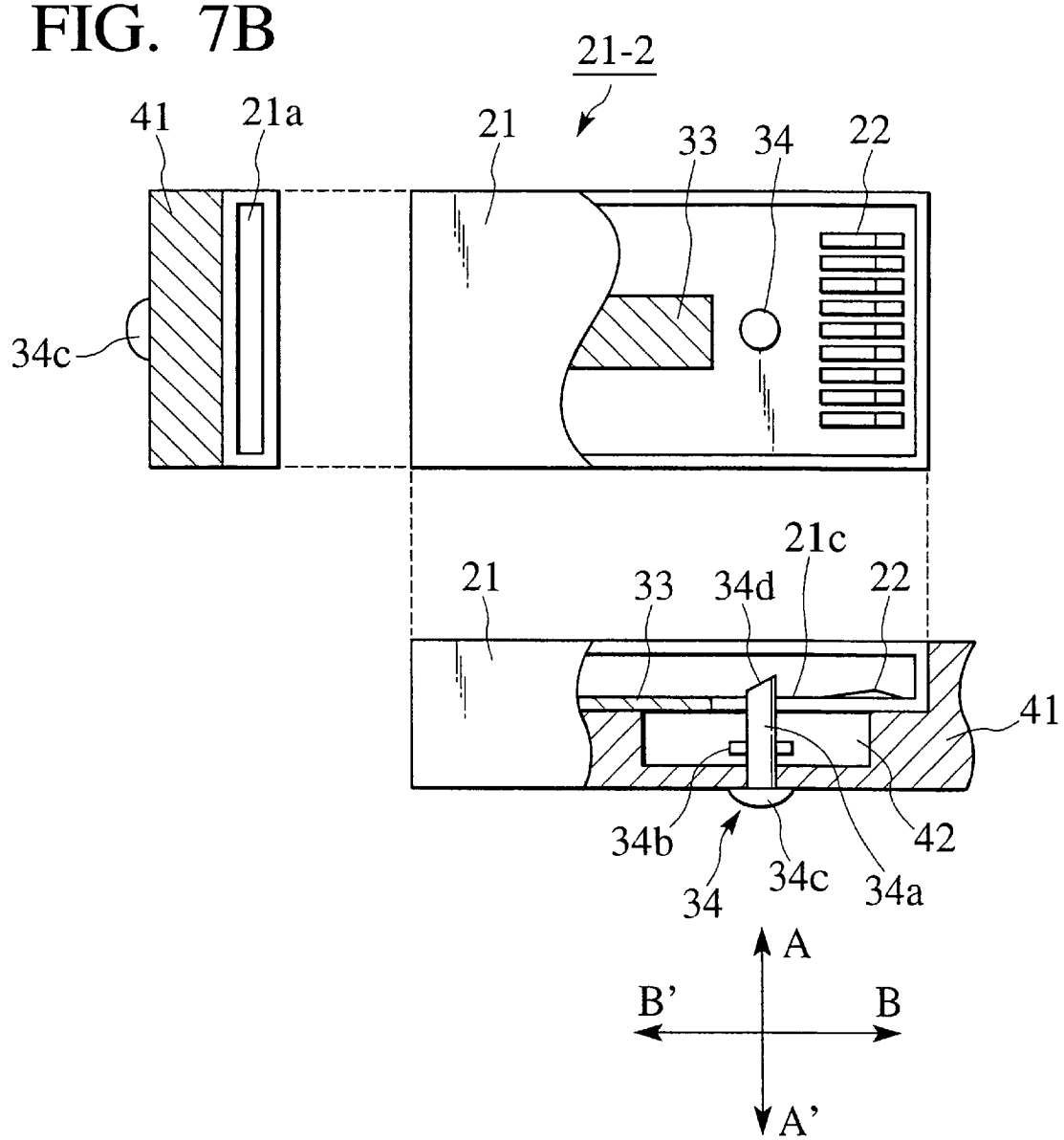

FIGS. 7A and 7B are diagrams showing a configuration of the memory card 10-2 and the card socket 21-1 according to the second embodiment of the present invention. In particular, FIG. 7A is a diagram showing the configuration of the memory card 10-2, and FIG. 7B is a diagram showing the configuration of the card socket 21-2.

The difference in configuration between the first embodiment and the second embodiment is only the shape of the magnet formed in the card type holder. See the shape of the magnet 13a formed in the card type holder 11 in the second embodiment shown in FIG. 7A. That is, the magnet 13a of the memory card 10-2 of the second embodiment has a rectangle shape along the direction of the length of the memory card 10-2. Further, the magnet 33 in the card socket 21-2 has a rectangle shape corresponding in position and shape to the magnet 13a in the memory card 10-2.

The fixed card releasing mechanism for releasing the memory card 10-2 in the fixed state from the card socket 21-2 is as follows.

The card socket 21-2 of the second embodiment, as shown in FIG. 7B, is fixed to a sidewall 41 of the main device. The card removal button 34 of a bar shape is penetrated, in reciprocally movable state, through the bottom surface 21c of the card socket 21-2 whose movable direction A–A' is vertical to the insertion direction B of the memory card 10-2. This card removal button 34 comprises a bar 34a, a stopper 34b, and a head section 34c. The end section 34d of the bar 34a in a hollow section in the card socket 21-1 has a sloped shape (for example, whose angle is 40° against the bottom surface of the card socket 21). The stopper 34b is attached to the middle section of the bar 34a. Another end of the card removal button 34 that is opposite to the end 34d forms the head section 34c that is out of the sidewall 41 of the main device (to which the card socket 21-2 is attached). The bar 34a forming the card removal button 34 is fasten to the bottom surface 21c of the card socket 21-2 with a low friction whose magnitude is a friction only to prevent a free fall of the card removal button 34.

Next, a description will be given of the mechanism of insertion and removable between the memory card 10-2 and the card socket 21-2 of the second embodiment with reference to FIGS. 8A to 8E.

FIGS. 8A to 8E are diagrams for explaining the mechanism of insertion and removal of the memory card 10-2 and the card socket 21-2 according to the second embodiment of the present invention.

Figure 8A:
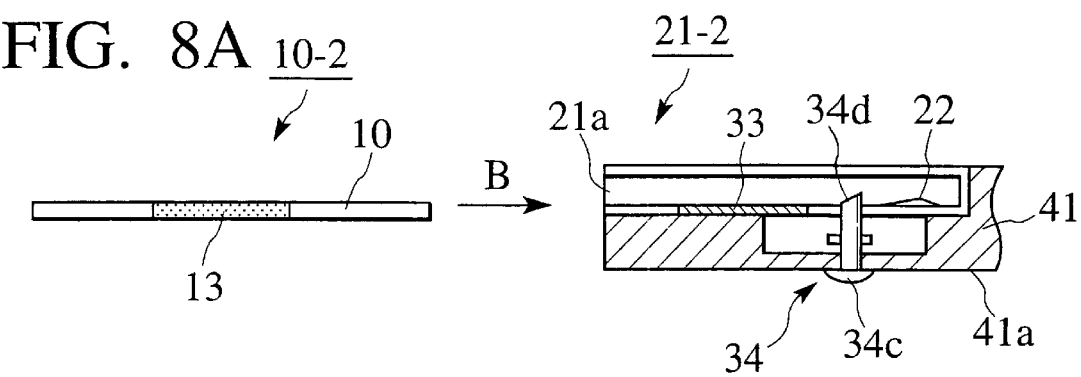
FIGS. 8A to 8E are diagrams for explaining a mechanism of insertion and removal of the memory card and the card socket according to the second embodiment of the present invention.
Figure 8B:
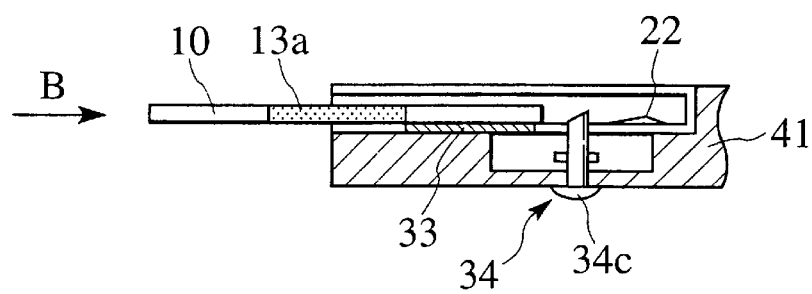

In the insertion of the memory card 10-2, the user pushes the card removable button 34 in the card socket 21-2 (see FIG. 8A). In this state, when the user inserts the memory card 10-2 only close to the card insertion section 21a in the card socket 21-2 along the correct direction B (see FIG. 8B), both the magnets 13a and 33 of the memory card 10-2 and the card socket 21-2 are attracted to each other by magnetic force as soon as the insertion of the memory card 10-2 is completed because both the magnets 13a and 33 have a rectangle shape along the card insertion direction B.

Thus, the memory card 10-2 is moved while contacting with the bottom surface 21c of the card socket 21-2. When the front part of the memory card 10-2 is reached to the slope part of the end section 34d in the card removal button 34, the card removal button 34 is pulled back toward the direction A' automatically.

Figure 8C:
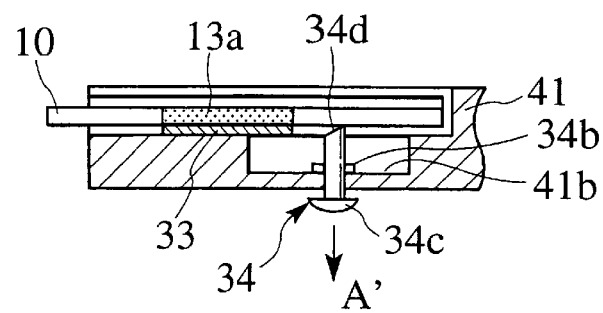
Figure 8D:
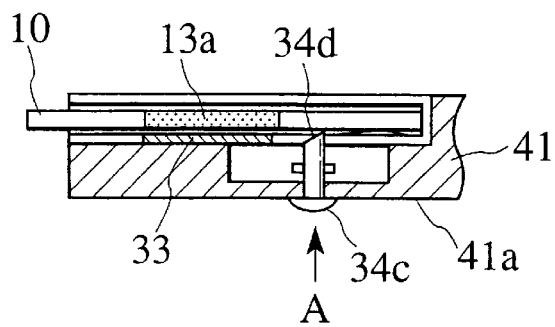
Figure 8E:
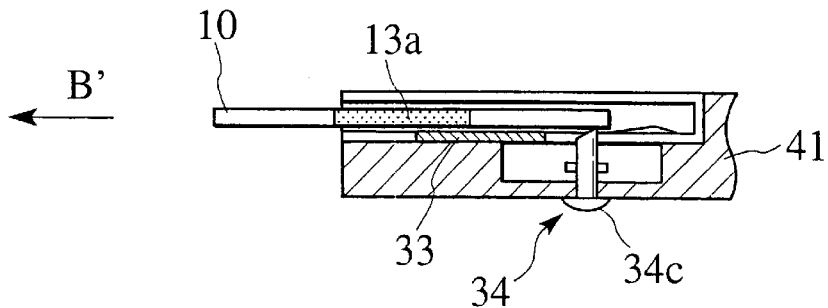

As soon as the insertion of the memory card 10-2 is completed, both the magnets 13a and 33 in the memory card and the card socket completely attract each other, so that the correct positioning for the memory card 10-2 and the electrical contact between the electrodes 12 and 22 can be achieved easily (see FIG. 8C).

On the other hand, in the removal of the memory card 10-2 from the card socket 21-2, when the user pushes the card removal button 34, the memory card 10-2 is thereby pushed up from the bottom surface 21c of the socket body 21 in the card socket 21-2, so that the magnet contact surface of the magnets 12 in the memory card 10-2 is separated from that of the magnet 22 in the card socket 21-2. Accordingly, the memory card 10-2 is released from the magnetically fixed state, and the user can pull out easily the memory card 10-2 from the card socket 21-2 with a weak force (see FIG. 8E).

As described above, according to the second embodiment of the present invention, it is possible for the user not to pull back the card removal button 34 for the following insertion of the memory card because the card removal button 34 in the card socket 21-2 is automatically pulled back to outside along the direction A'.

Third Embodiment

Figure 9:
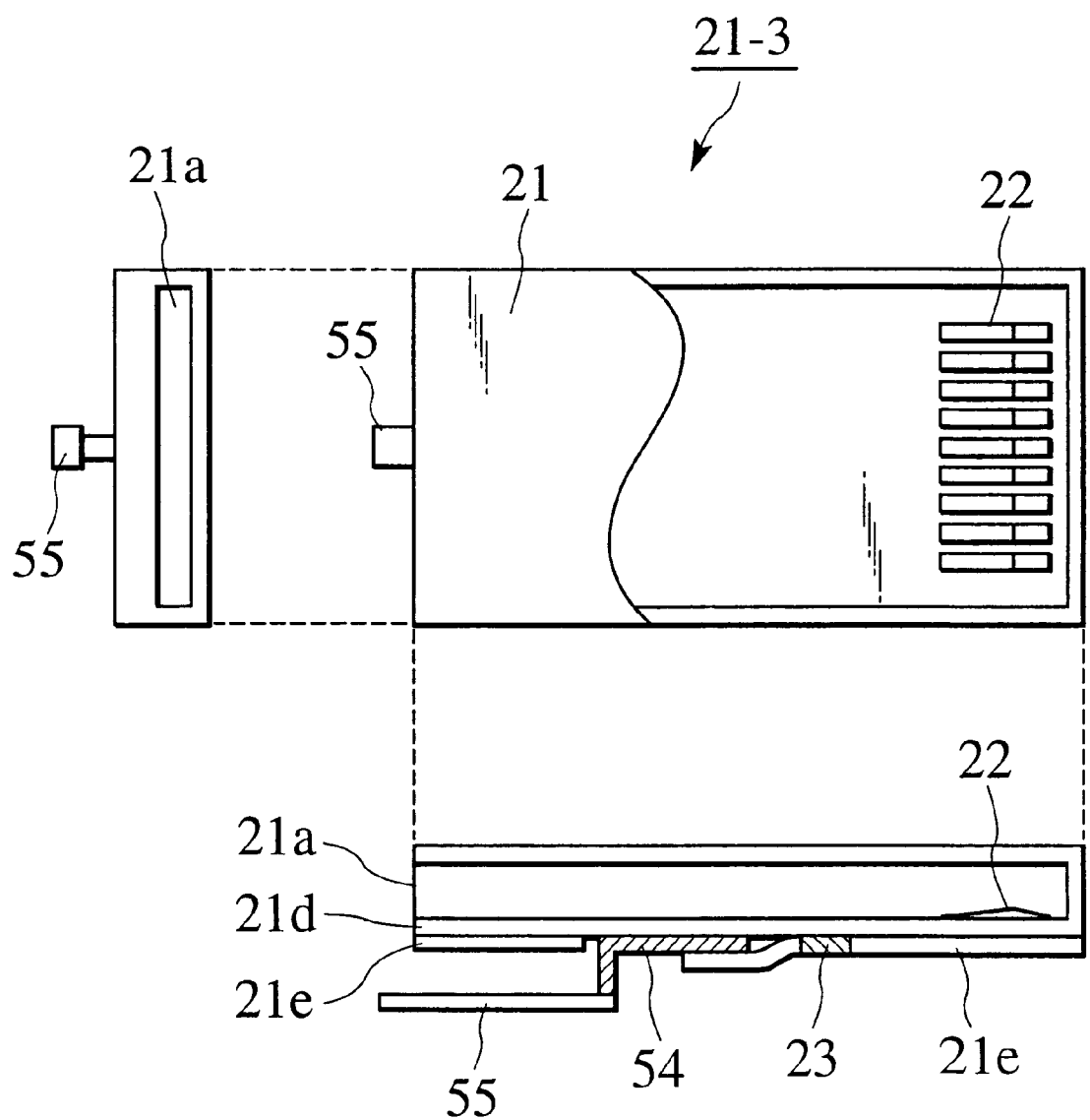
FIG. 9 is a diagram showing a configuration of a card socket according to the third embodiment of the present invention.

FIG. 9 is a diagram showing a configuration of the card socket according to the third embodiment of the present invention.

The card socket 21-3 of the third embodiment has the following configuration of the fixed card releasing mechanism of two stages for releasing the memory card in the fixed state from the card socket 21-3.

In the configuration of the fixed card releasing mechanism, a spring electrodes 22 are formed on the bottom surface of the socket body 21d in the upper stage, and the magnet 23 is formed on the bottom surface of the socket body 21e in the lower stage. In addition, the bottom surface of the socket body 21d in the upper side is made of a material of a relatively high magnetic permeability, and a plastic plate 54 made of a relatively low magnetic permeability is inserted between the bottom surfaces of both the socket bodies 21d and 21e in the upper and lower stages (or it is also acceptable to use another material made of a low magnetic permeability instead of the plastic plate 54).

Because the magnetic force to the upper section by the magnetic 23 can be sealed and released by the plastic plate 54, the plastic plate 54 is so attached to the card socket 21-3 that the plastic plate 54 can be reciprocally moved between the upper side bottom surface and the lower side bottom surface in the socket body by the operation of a card removal button 55.

Next, a description will be given of the mechanism of insertion and removable between the memory card 10-1 shown in FIGS. 4A to 4C and the card socket 21-3 of the third embodiment with reference to FIGS. 10A to 10F.

FIGS. 10A to 10F are diagrams for explaining the mechanism of insertion and removal of the memory card and the card socket according to the third embodiment of the present invention.

Figure 10A:
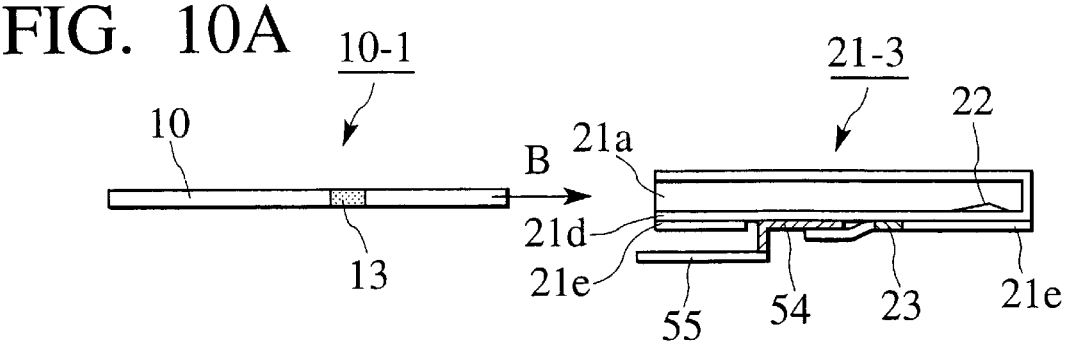
FIGS. 10A to 10F are diagrams for explaining a mechanism of insertion and removal of the memory card and the card socket according to the third embodiment of the present invention.
Figure 10B:
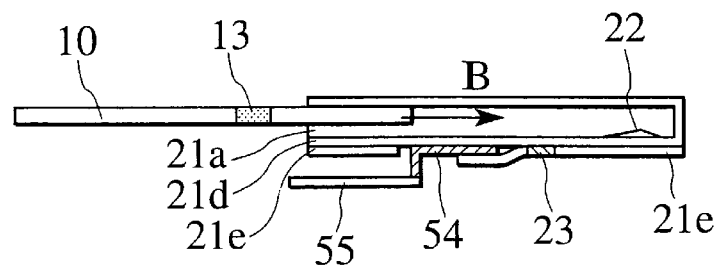

In the insertion of the memory card 10-1 to the card socket 21-3, firstly, the card removal button 55 in the card socket 21-3 is pulled back to the ready position (see FIG. 10A). In this state, because the bottom surface in the lower stage in the socket body is made of a soft material such as a film sheet, both the bottom surfaces in the upper and lower stages other than the area of the plastic plate 54 and near area thereof are kept in absolute contact with each other.

Then, the user inserts the memory card 10-1 into the card socket 21-3 through the card insertion section 21a thereof along the correct direction B (see FIG. 10B) until the front section of the memory card 10-1 is reached to the front stopper section 21b in the socket body 21 of the card socket 21-3. In this state, similar to the first and second embodiments, it is possible for the user to insert the memory card 10-1 easily with a weak force into the card socket 21-3 because the spring force of each spring electrode 22 in the card socket 21-3 is weak.

As soon as the insertion of the memory card 10-1 to the card socket 21-3 is completed, both the magnets 13 and 23 in the memory card 10-1 and the card socket 21-3 attract each other.

Figure 10C:
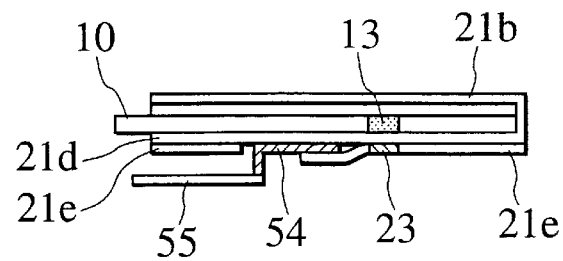

Accordingly, it is easily possible to perform the positioning of the memory card 10-1 in the card socket 21-3 and to electrically contact both the electrodes 12 and 22 thereof correctly (see FIG. 10C).

Figure 10D:
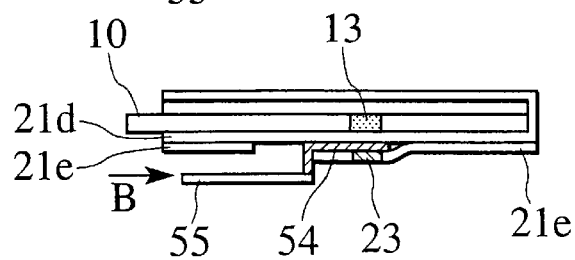
Figure 10E:
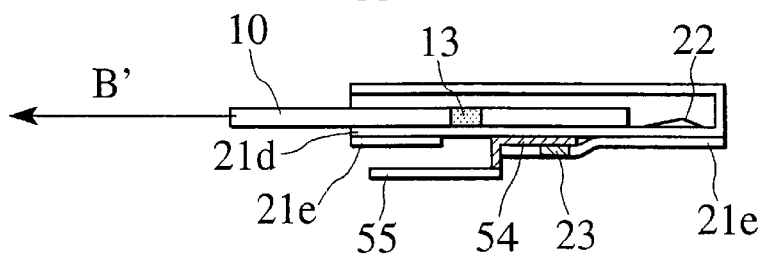
Figure 10F:
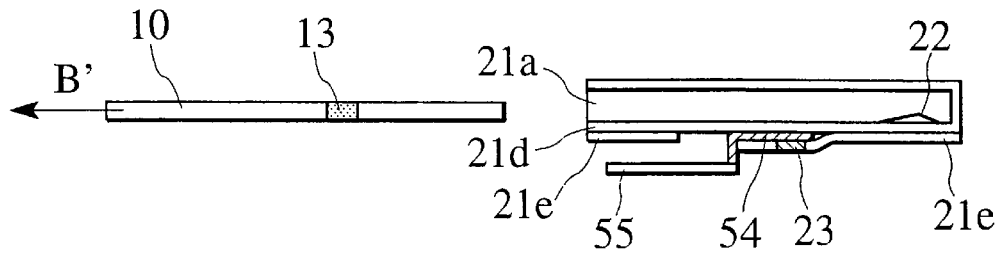

On the other hand, in the removal of the memory card 10-1 from the card socket 21-3, as shown in FIG. 10D, the user pushes the card removal button 55 along the direction B. The memory card 10-1 is thereby released from the fixed state because the plastic plate 54 is inserted between the magnets 13 and 23 and the magnetic force between the memory card 10-1 and the card socket 21-3 becomes weak. That is, it is possible for the user to remove the memory card 10-1 from the card socket 21-3 easily with a weak force (see FIGS. 10E and 10F).

In the configuration of the third embodiment described above, it is possible for the user to insert the memory card into and also to remove the memory card from the card socket smoothly.

Figure 11:
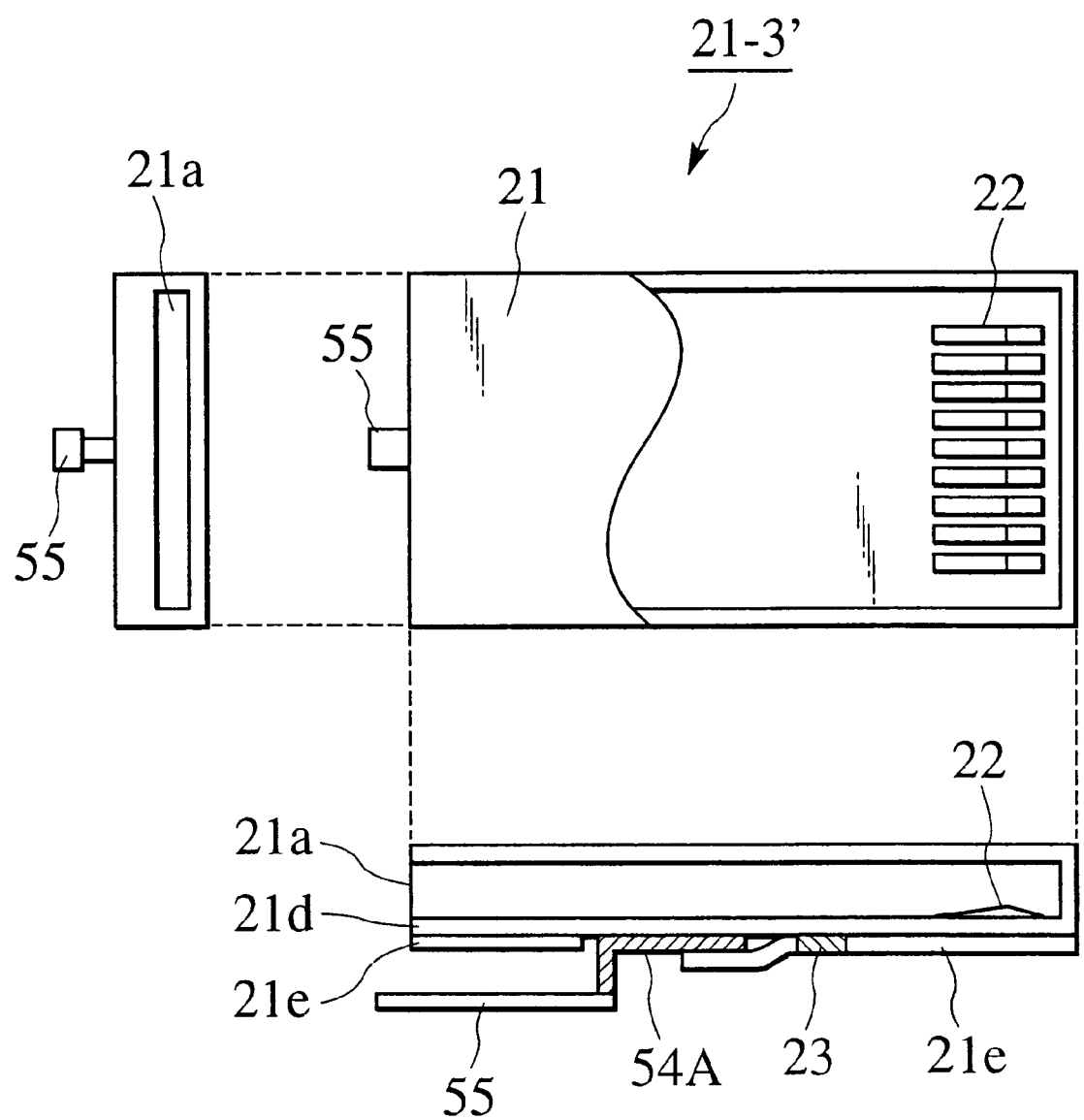
FIG. 11 is a diagram showing another configuration of the card socket according to the third embodiment of the present invention.

FIG. 11 is a diagram showing another configuration of the card socket according to the third embodiment of the present invention. Although the third embodiment of the present invention shown in FIG. 9 has disclosed the configuration of the card socket 21-3 using the plastic plate 54 as the fixed card releasing mechanism for releasing the memory card 10-1 from the card socket 21-3 by using the magnetic force, it is also possible to use a card socket 21-3' using a magnetic shield plate 54A (for example, an iron plate, a ferrite plate, a silicon steel plate, and the like), as shown in FIG. 11, instead of the plastic plate 54.

Fourth Embodiment

Figure 12A:
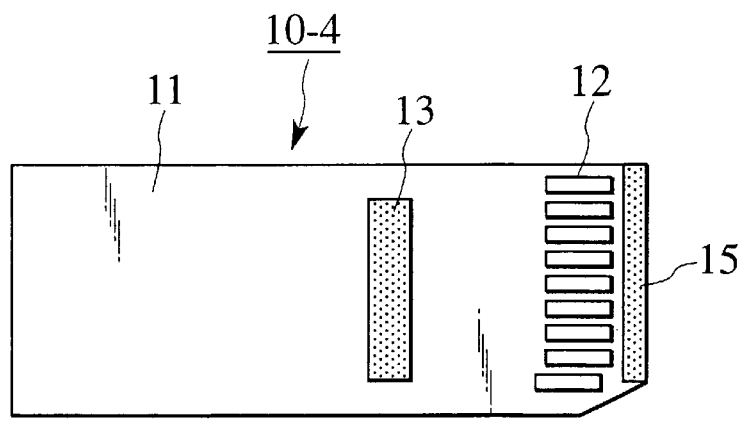
FIGS. 12A to 12C are diagrams showing a configuration of a memory card and a card socket according to the fourth embodiment of the present invention.
Figure 12B:
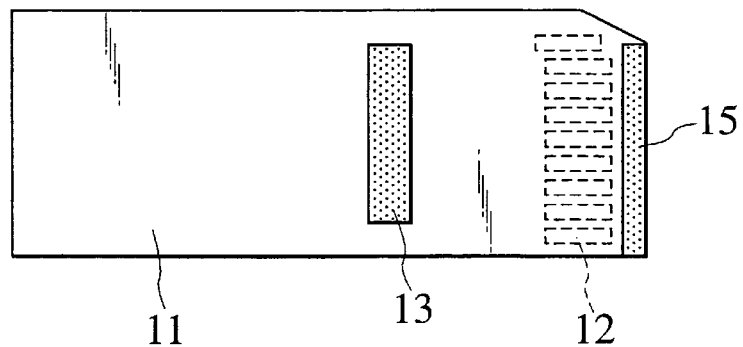
Figure 12C:
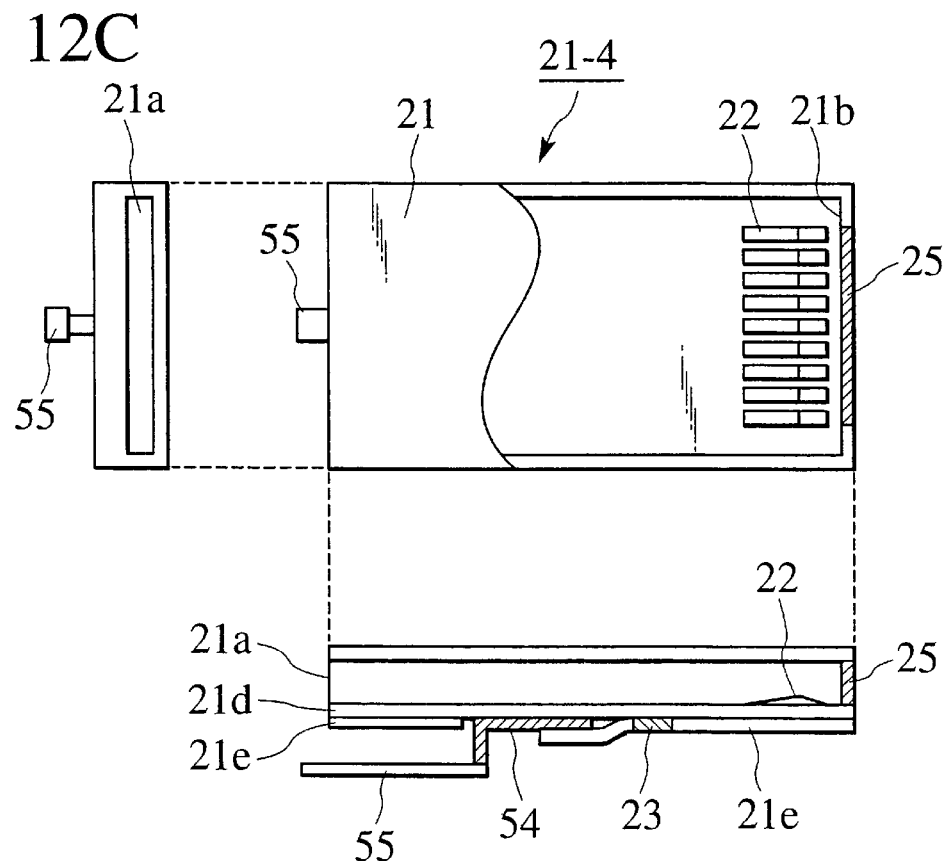

FIGS. 12A to 12C are diagrams showing a configuration of the memory card and the card socket according to the fourth embodiment of the present invention. In particularly, FIG. 12A is a diagram showing the configuration of one surface of the memory card 10-4 where electrodes are formed in array, FIG. 12B is a diagram showing the configuration of the other surface of the memory card 10-4, and FIG. 12C is a diagram showing a plan view, a sectional view, and a side view of the card socket 21-4.

As shown in FIGS. 12A and 12B, the front section of the memory card 10-4 of the fourth embodiment is made of a ferromagnetic material 15 in addition to the configuration of the first embodiment shown in FIGS. 4A to 4C. Further, as shown in FIG. 12C, a magnet 25 is formed at the front stopper section 21b in the socket body 21 in the card socket 21-4, corresponding in position to the ferromagnetic material 15 in the memory card 10-4 in the inserted state, in addition to the configuration of the third embodiment shown in FIG. 9. Furthermore, both the magnets 13 and 23 attract each other with a strong magnetic force which is greater than that of other embodiments.

Next, a description will be given of the mechanism of insertion and removable between the memory card 10-4 and the card socket 21-4 of the fourth embodiment with reference to FIGS. 13A to 13F.

FIGS. 13A to 13F are diagrams for explaining the mechanism of insertion and removal of the memory card and the card socket according to the fourth embodiment of the present invention.

Figure 13A:
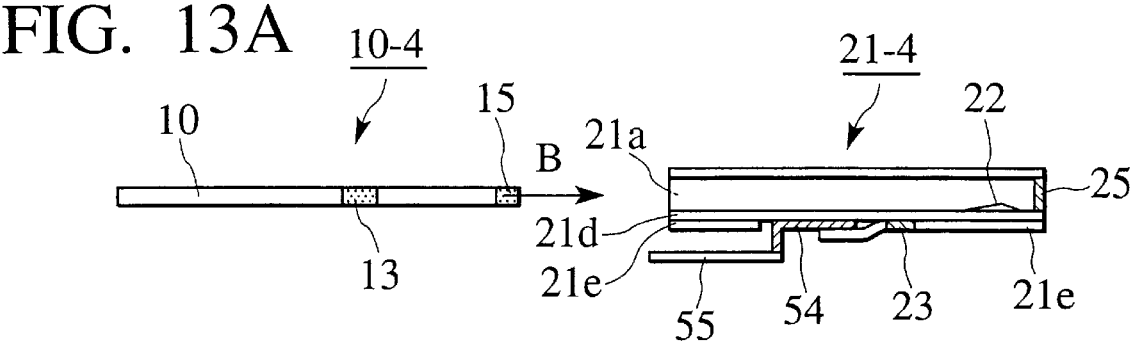
FIGS. 13A to 13F are diagrams for explaining a mechanism of insertion and removal of the memory card and the card socket according to the fourth embodiment of the present invention.

In the insertion of the memory card 10-4 to the card socket 21-4, firstly, the card removal button 55 in the card socket 21-4 is pulled back to the ready position (see FIG. 13A). In this state, like the configuration of the third embodiment, because the bottom surface in the lower stage in the socket body is made of a soft material such as a film sheet, both the bottom surfaces in the upper and lower stages other than the area of the plastic plate 54 and near area thereof are kept in absolute contact with each other.

Figure 13B:
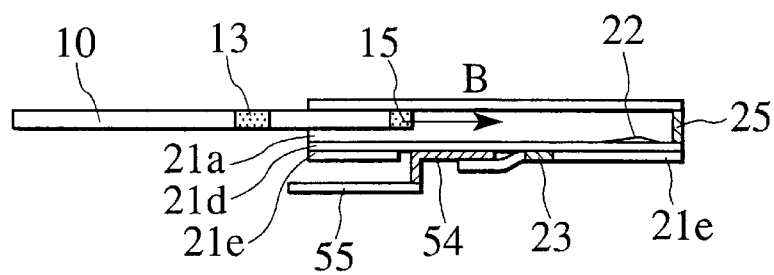
Figure 13C:
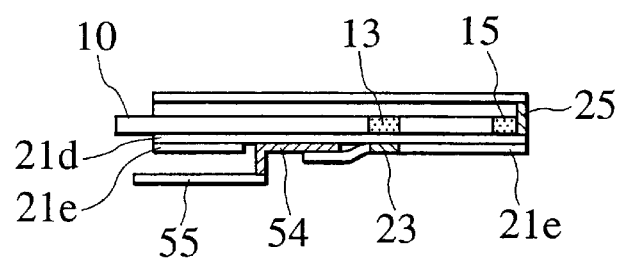

Then, when the user inserts the memory card 10-4 only close to the card insertion section 21a in the card socket 21-4 along the correct direction B, the memory card 10-4 is moved into the card socket 21-4 by a strong magnetic force generated between the socket body 21 and the memory card 10-4 (see FIG. 13B).

As soon as the front section of the memory card 10-4 is reached to the front stopper section 21b of the socket body 21 in the card socket 21-4, both the magnets 13 and 23 in the memory card 10-4 and the socket body 21 in the card socket 21-4 strongly attract each other. Thereby, it is easily possible to perform the positioning of the memory card 10-4 in the card socket 21-4 and to contact both the electrodes 12 and 22 in the memory card 10-4 and the card socket 21-4 correctly (see FIG. 13C).

Figure 13D:
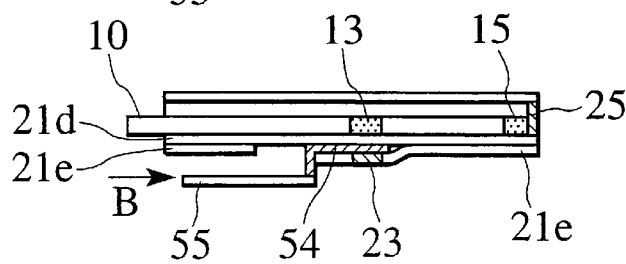
Figure 13E:
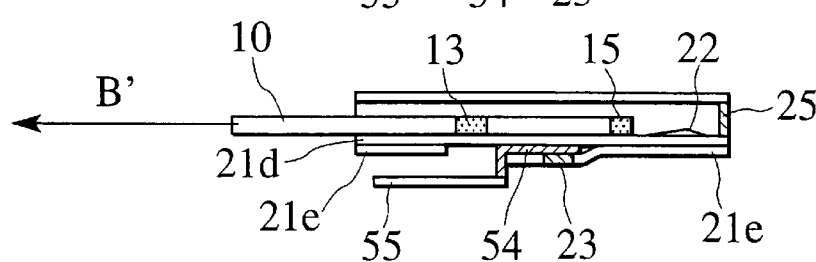
Figure 13F:
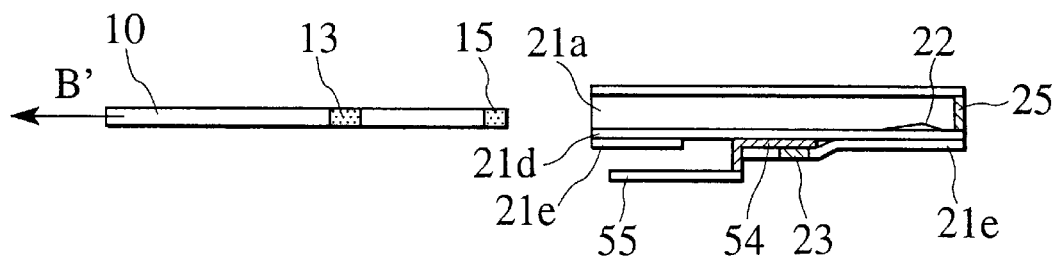

On the other hand, in the removal of the memory card 10-4 from the card socket 21-4, as shown in FIG. 13D, when the user pushes the card removal button 55 along the direction B, the memory card 10-4 is thereby released from the fixed state because the plastic plate 54 is inserted between the magnets 13 and 23 and the magnetic force between the memory card 10-4 and the card socket 21-4 becomes weak. That is, it is possible for the user to remove the memory card 10-4 from the card socket 21-4 easily with a weak force (see FIGS. 13E and 13F).

In the configuration of the fourth embodiment described above, when the user inserts the memory card 10-4 only close to the card insertion section 21a in the card socket 21-4, the memory card 10-4 is moved into the socket body 21 in the card socket 21-4 automatically and smoothly. This increases the user's convenience to handle the memory card.

By the way, it is also possible to have the card insertion section 21a of a wide shape in the socket body 21 in the card socket 21-4. In this configuration, when the user inserts the memory card 10-4 close to the card insertion section 21a, the memory card 10-4 can be moved into the card socket 21-4 smoothly without contacting the memory card 10-4 to the card insertion section 12a.

Furthermore, according to the fourth embodiment, although the ferromagnetic material 15 is formed at the front section of the memory card 10-4 and the magnet 25 is formed at the front stopper section 21b in the socket body 21 in the card socket 21-4, it is possible to eliminate both the ferromagnetic material 15 and the magnets 25 when the magnet force of each of the magnet 13 in the memory card 10-4 and the magnet 23 in the socket body 23 in the card socket 21-4 is strong.

Fifth Embodiment

Figure 14:
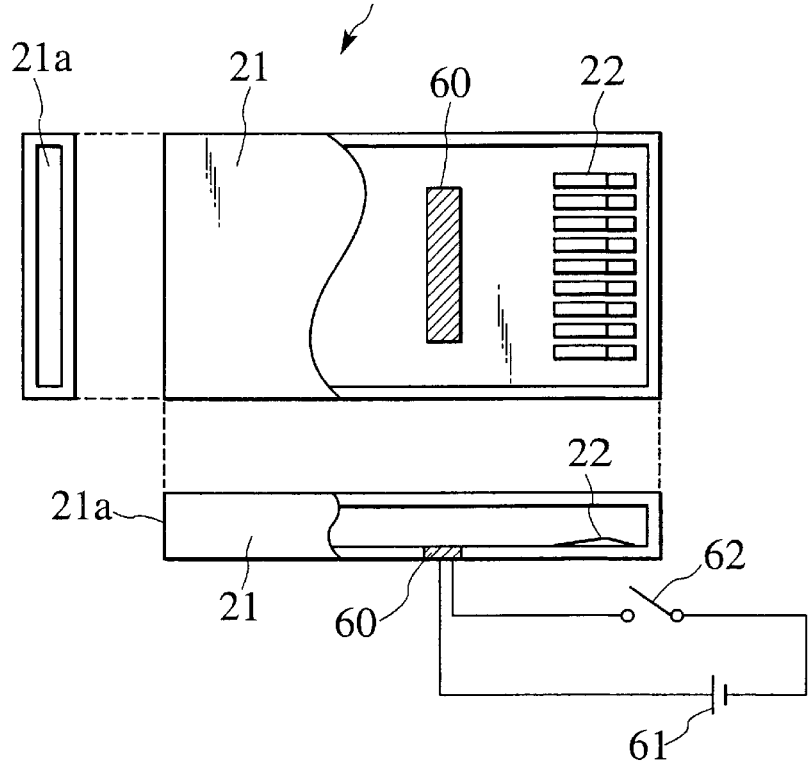
FIG. 14 is a diagram showing a configuration of a card socket according to the fifth embodiment of the present invention.

FIG. 14 is a diagram showing a configuration of the card socket according to the fifth embodiment of the present invention. This card socket 21-5 of the fifth embodiment shown in FIG. 14 is used for inserting the memory card 10-1 of the configuration shown in FIGS. 4A to 4C.

The card socket 21-5 of the fifth embodiment has an electromagnet 60 instead of the magnet 23 and has no card removal button 24 in the configuration of the card socket 21-1 shown in FIG. 5.

In the insertion of the memory card to the card socket 21-5 in the fifth embodiment, the user enters a switch 62 into ON, so that the electromagnet 60 generates magnetic force by a current flowing from a power source 61. On the other hand, in the removal of the memory card 10-1 from the card socket 21-5, the user enters the switch 62 into OFF, so that the electromagnet 60 halts to generate the magnetic force because no current thereby flows. It is possible for the user to perform easily the insertion of the memory card 10-1 to and the removal of it from the card socket 21-5 with a weak force.

In addition, it is also possible to apply the configuration of the card socket 21-5 of the fifth embodiment into the fourth embodiment shown in FIGS. 12A to 12C. In this case, like the fourth embodiment, when the user inserts the memory card 10-1 only close to the card insertion section 21a in the card socket 21-5, the memory card can be moved into the card socket 21-5 smoothly without any contacting of the memory card 10-1 to the card insertion section 12a.

Sixth Embodiment

Although each embodiment of the present invention described above uses the card socket of a box form, the sixth embodiment uses a card socket whose one surface is an opening.

Figure 15:
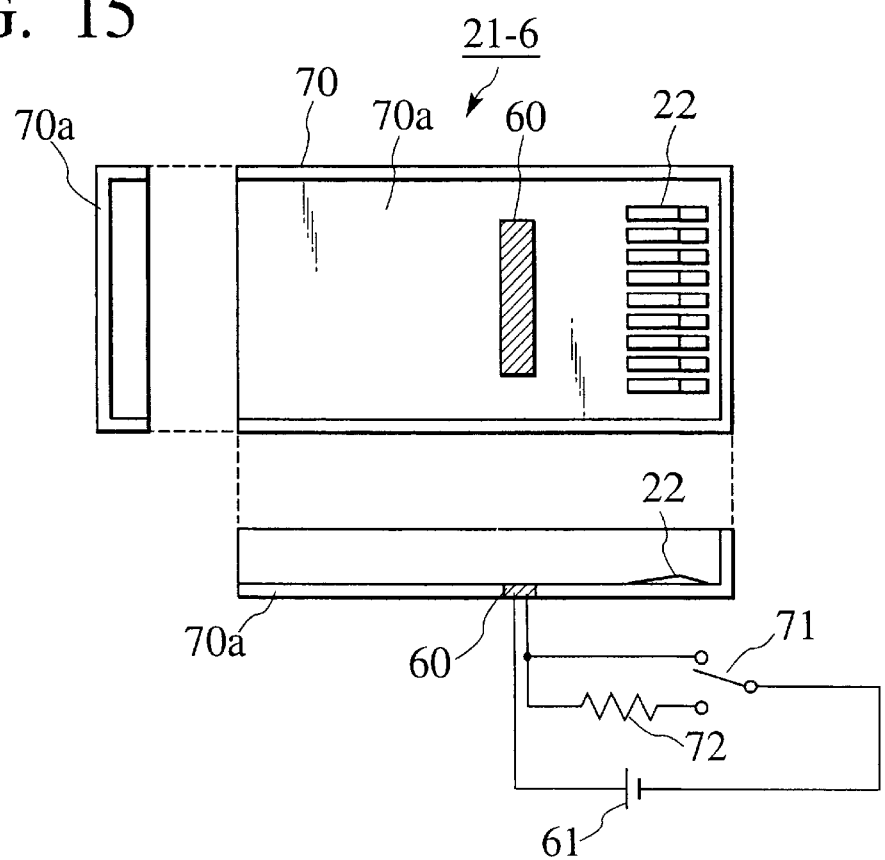
FIG. 15 is a diagram showing a configuration of a card socket according to the sixth embodiment of the present invention.

FIG. 15 is a diagram showing a configuration of the card socket 21-6 according to the sixth embodiment of the present invention. This card socket 21-6 is used for inserting the memory card 10-1 shown in FIGS. 4A to 4C.

The card socket 21-6 has a socket body 70 whose one side is an opening, and the spring electrodes 22 and the electromagnet 60 are formed on the bottom surface of the socket body 70. The electromagnet 60 has both a strong magnet force mode (the current flows not through a resistance 72) and a weak magnet force mode (the current flows through the resistance 72) that are switched by a switch 71.

In the insertion of the memory card to the card socket 21-6 in the sixth embodiment, the user enters the switch 71 into the strong magnetic force mode, and the user then set the memory card 10-1 in the card socket 21-6 through the opening in the socket body 70. The user can thereby set the memory card 10-1 in the card socket 21-6 easily.

On the other hand, in the removal of the memory card 10-1 from the card socket 21-6, the user enters the switch 71 into the weak magnetic force mode, so that the user can remove the memory card 10-1 from the card socket 21-6 easily with a weak force without falling the memory card 10-1 from the card socket 21-6.

In addition, it is also possible to apply the configuration of the electromagnetic in the card socket 21-6 of the sixth embodiment shown in FIG. 15 into the card socket 21-5 of a box form of the fifth embodiment shown in FIG. 14. Furthermore, it is possible to apply the configuration of the electromagnetic of the sixth embodiment into the configuration of the memory card. Still furthermore, it is also possible to apply the configuration of the electromagnetic of the sixth embodiment into the configuration of the memory card and the card socket according to the fourth embodiment shown in FIGS. 12A to 12C.

Figure 16:
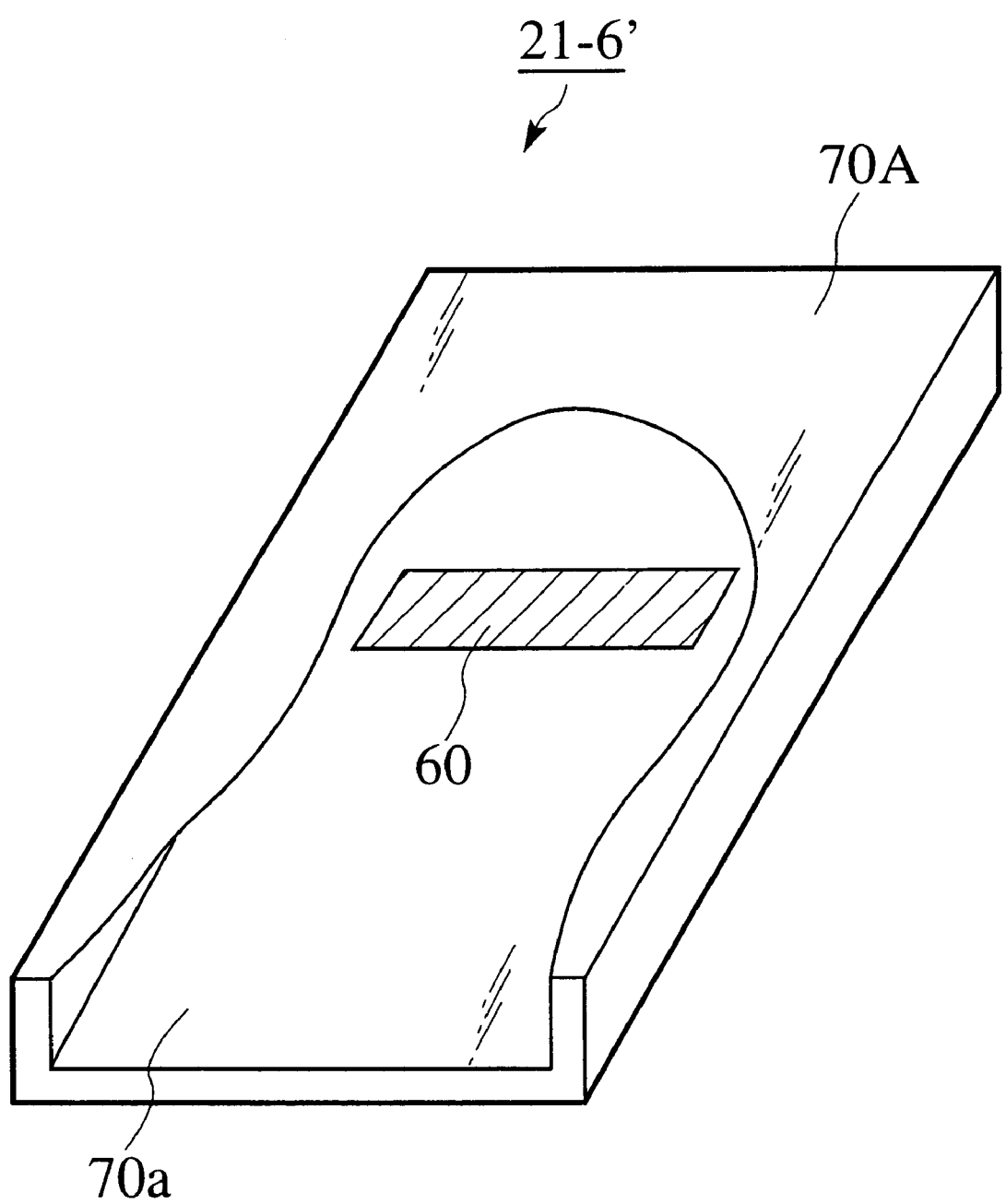
FIG. 16 is a diagram showing another configuration of the card socket according to the sixth embodiment of the present invention.

FIG. 16 is a diagram showing another configuration of the card socket according to the sixth embodiment of the present invention.

Although this sixth embodiment has disclosed the configuration in which the entire of one side of the socket body is an opening, it is also possible to use a card socket 21-6' in which a part of one side of a socket body 70A is an opening, as shown in FIG. 16.

When the card socket in which the entire of one side is an opening shown in FIG. 15 is used in the insertion of the memory card 10-1 and when the user inserts the memory card 10-1 into the card socket 21-6 along an oblique angle, there is a possibility not to insert the memory card 10-1 in the card socket 21-6 completely. However, when the user uses the card socket 21-6' having the configuration shown in FIG. 16 in which a part of one surface of the socket body 70A is an opening, it is possible for the user to insert the memory card 10-1 into the card socket 21-6' accurately because the upper wall section in a card insertion section 70a of the socket body 70A functions a guide for the memory card 10-1.

In addition, it is possible to apply the card socket having the configuration in which one side of the socket body is the opening (shown in FIG. 15) into the card sockets equipped with the fixed card releasing mechanism such as the first to fourth embodiments shown in FIGS. 5, 7B, 9, and 12C.

Seventh Embodiment

In the seventh embodiment, the magnet formed on the memory card and the card socket is covered with a magnetic shied material.

Figure 17A:
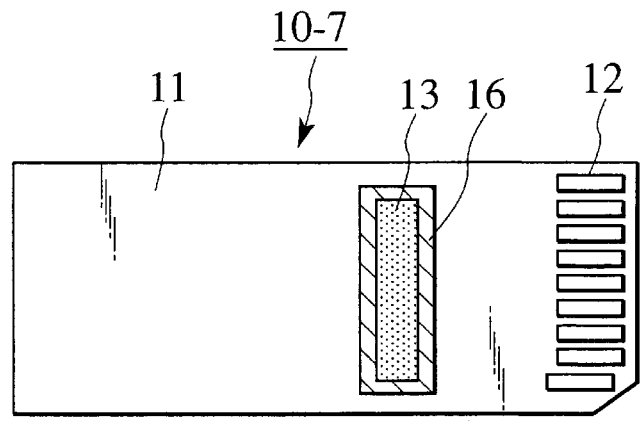
FIGS. 17A to 17C are diagrams showing a configuration of a memory card according to the seventh embodiment of the present invention.
Figure 17B:
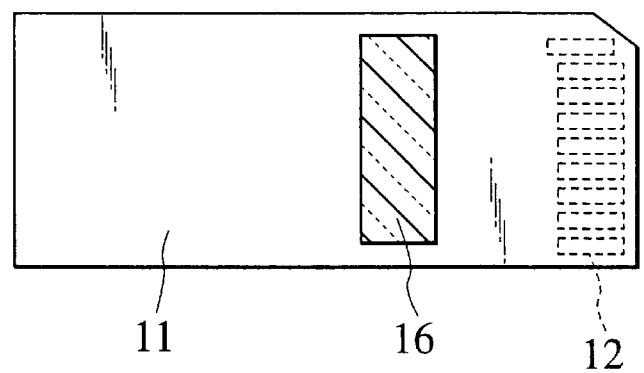
Figure 17C:
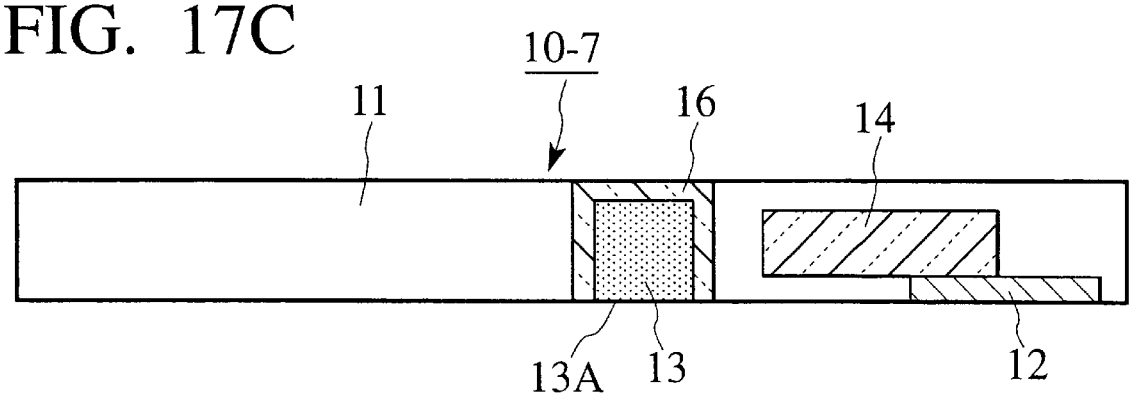
Figure 18:
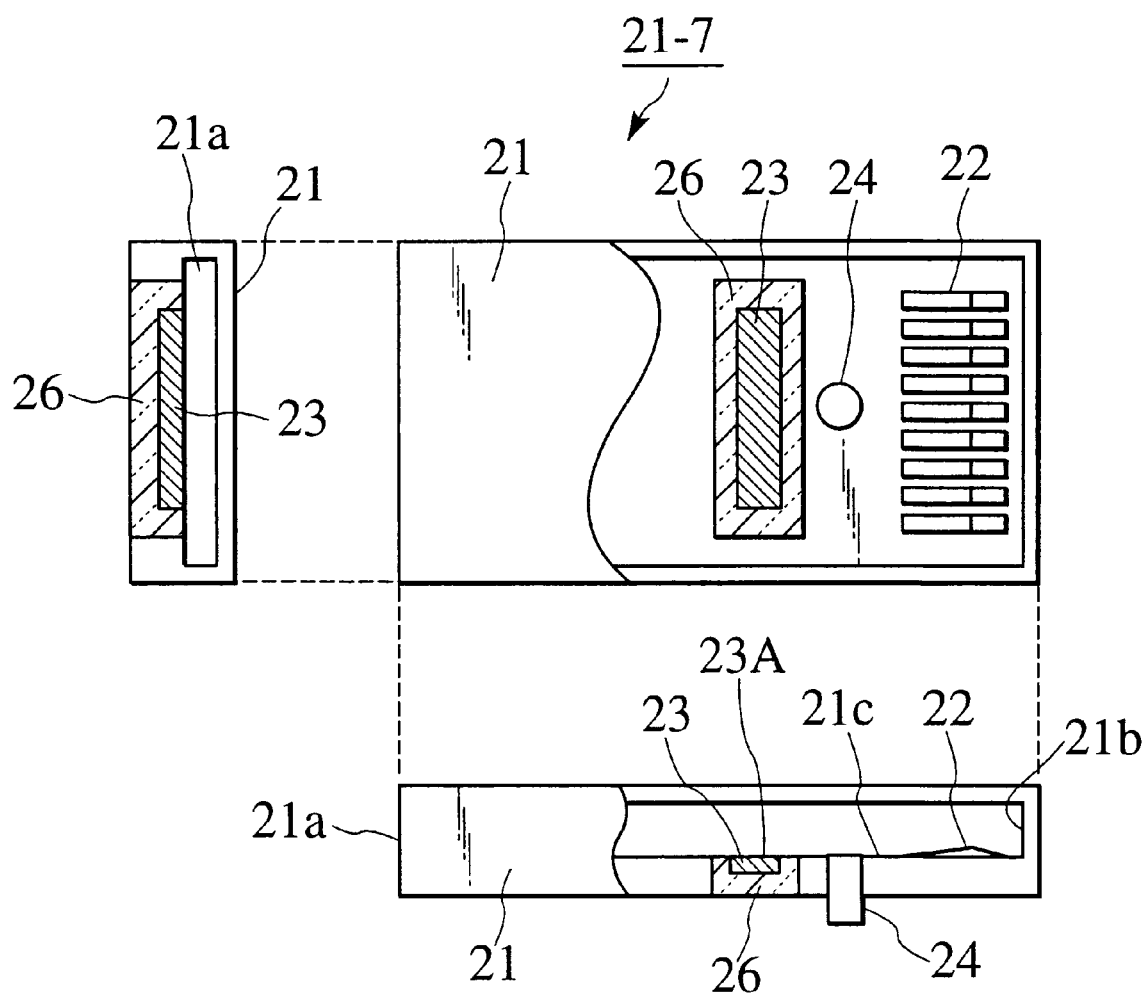
FIG. 18 is a diagram showing a configuration of a card socket according to the seventh embodiment of the present invention.

FIGS. 17A to 17C are diagrams showing a configuration of the memory card 10-7 according to the seventh embodiment of the present invention. In particularly, FIG. 17A is a plan view of the electrode side in the memory card 10-7, FIG. 17B is a plan view of non-electrode (on which no electrode is formed) side in the memory card 10-7, and FIG. 17C is a sectional view of the memory card 10-7. FIG. 18 is a diagram showing a configuration of the card socket 21-7 according to the seventh embodiment of the present invention.

As shown in FIGS. 17A to 17C, the memory card 10-7 has the configuration in which the periphery section 16 of the magnet 13 excepting the exposed surface 13A of the electrode 13 is covered with a magnetic shield material 16.

The card socket 21-7 of the seventh embodiment shown in FIG. 18 has the configuration in which the periphery section 26 of the magnet 23 excepting the exposed surface 23A of the electrode 23 is covered with a magnetic shield material 26.

Because the magnetic shield materials 13 and 26 can shield leakage flux from the magnets 13 and 23, it is possible to prevent any occurrence of adverse influence to peripheral electronic devices caused by the leakage flux.

Eighth Embodiment

Figure 19A:
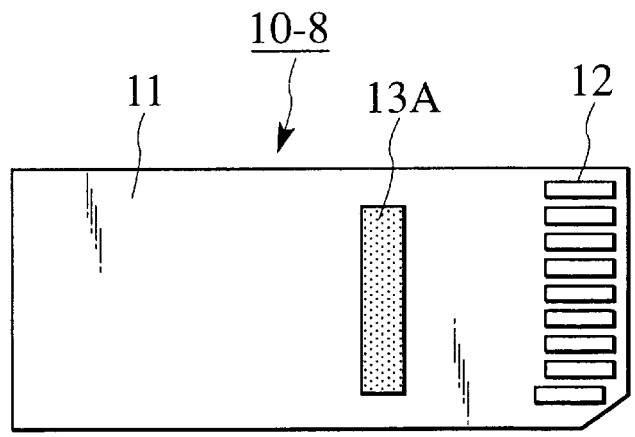
FIGS. 19A to 19C are diagrams showing a configuration of a memory card according to the eighth embodiment of the present invention.
Figure 19B:
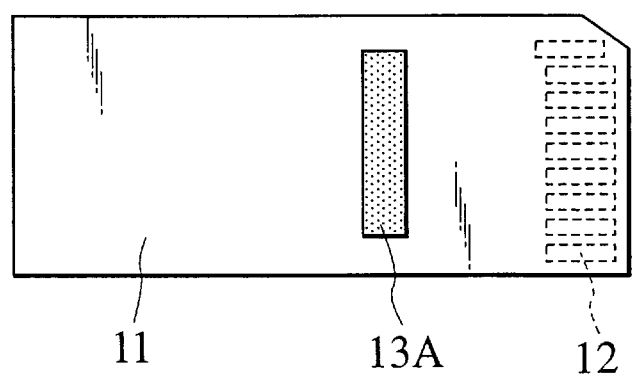
Figure 19C:
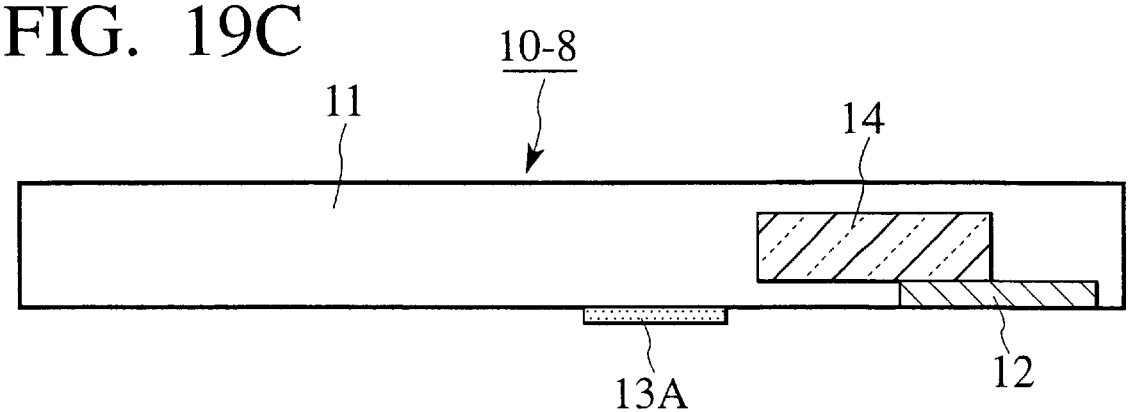

FIGS. 19A to 19C are diagrams showing a configuration of a memory card according to the eighth embodiment of the present invention. In particularly, FIG. 19A is a plan view of the electrode side in the memory card 10-8, FIG. 19B is a plan view of non-electrode side (on which no electrode is formed) in the memory card 10-8, and FIG. 19C is a sectional view of the memory card 10-8.

This memory card 10-8 has the configuration in which a ferromagnetic sheet 13A made of a ferromagnetic material of a sheet shape is attached on the surface of a base material (as the card-type holder 11) made of plastic in which the memory device module 14 is embedded.

Even if no ferromagnetic material is embedded in a memory card, the configuration of the memory card 10-8 shown in FIGS. 19A to 19C can be applied to the memory card of each embodiment described above only by pasting this ferromagnetic sheet 13A on the memory card.

In addition, it is also possible to use the ferromagnetic material instead of the magnet formed in the memory card and the card socket in each embodiment described above.

FIGS. 20A to 20D are diagrams showing other configurations of the memory cards according to the present invention, and FIGS. 21A to 21D are diagrams showing other configurations of the card sockets according to the present invention.

Figure 20A:
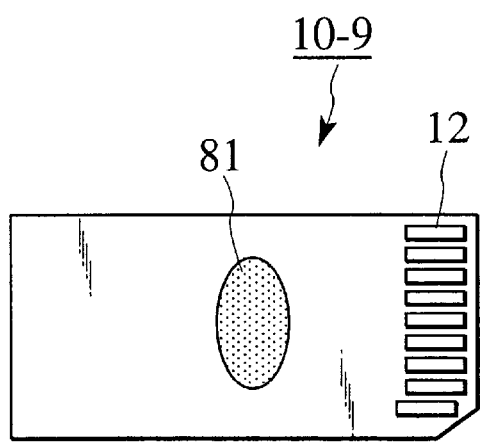
FIGS. 20A to 20D are diagrams showing other configurations of the memory cards according to the present invention.
Figure 20B:
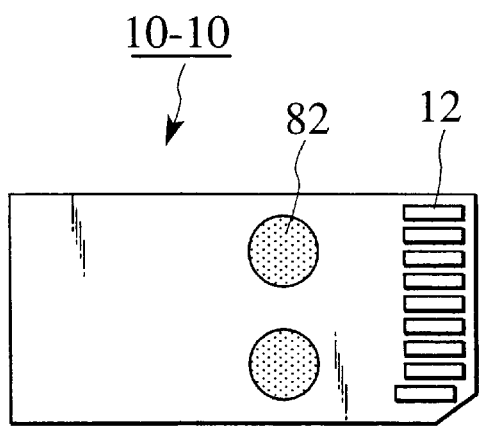
Figure 20C:
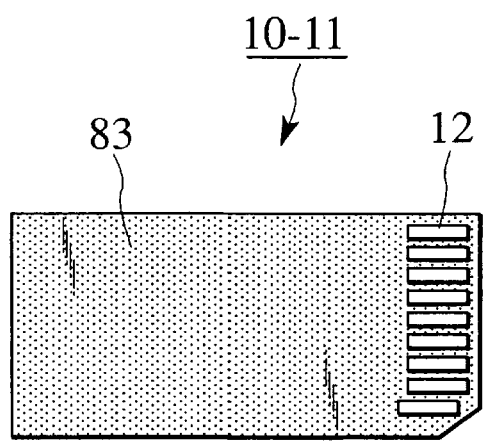
Figure 20D:
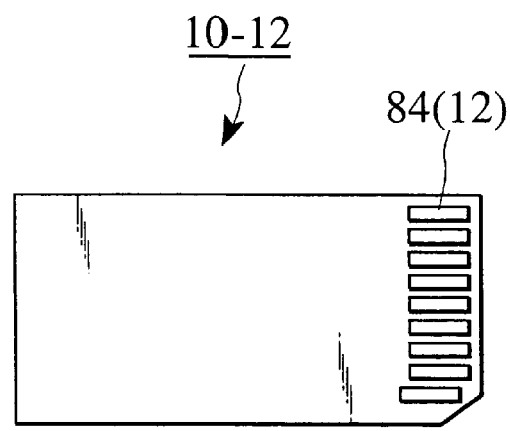
Figure 21A:
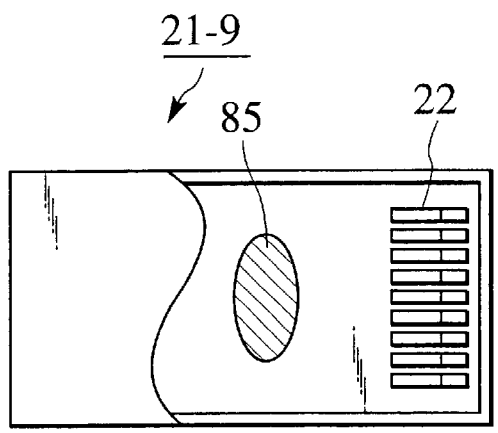
FIGS. 21A to 21D are diagrams showing other configurations of the card sockets according to the present invention.
Figure 21B:
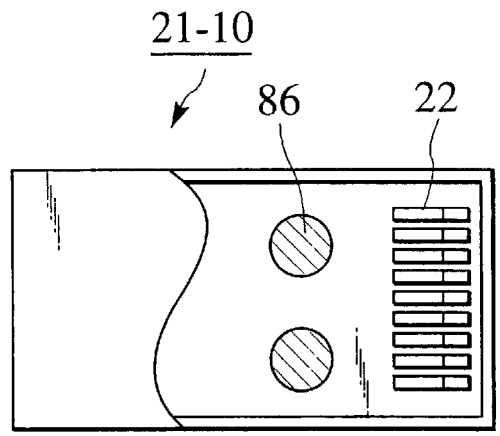
Figure 21C:
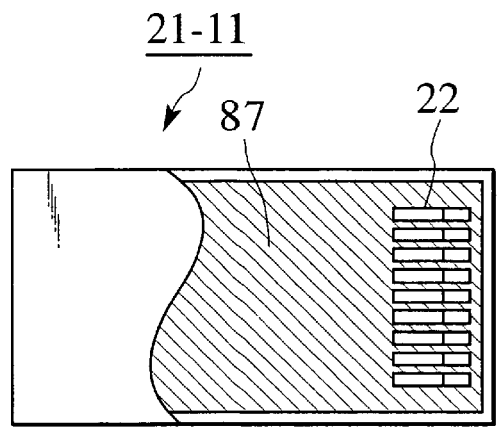
Figure 21D:
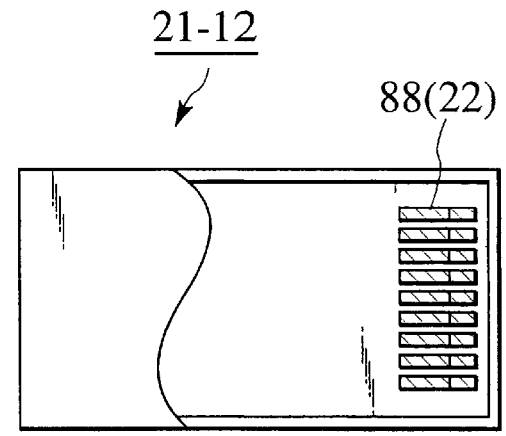

There are many shapes of the ferromagnetic material to be used instead of the magnets in the memory cards and the card sockets of the embodiments of the present invention described above. For example, the shapes of the memory cards 20-9 to 20-12 shown in FIGS. 20A to 20D and the shapes of the card sockets 21-9 to 21-12 shown in FIGS. 21A to 21D are acceptable. That is, the following configurations are available:

The ferromagnetic material 81 and 85 of an oval shape as shown in FIG. 20A and FIG. 21A;

The ferromagnetic material 82 and 86 of a circle shape as shown in FIG. 20B and FIG. 21B;

The ferromagnetic material 83 and 87 which is formed on the entire of the memory card excepting the electrodes 12 as shown in FIG. 20C and FIG. 21C; and The electrodes 12 and 22 made of only ferromagnetic material 84 and 88 in the memory card and the card socket as shown in FIG. 20D and FIG. 21D.

Furthermore, it is acceptable to use an electromagnet instead of the ferromagnetic material in each of the above-described configurations.

Moreover, it is also possible to use electrodes of only an exposed type having non-spring mechanism instead of the spring electrodes 22 in the card sockets in each embodiment.

Ninth Embodiment

Figure 22:
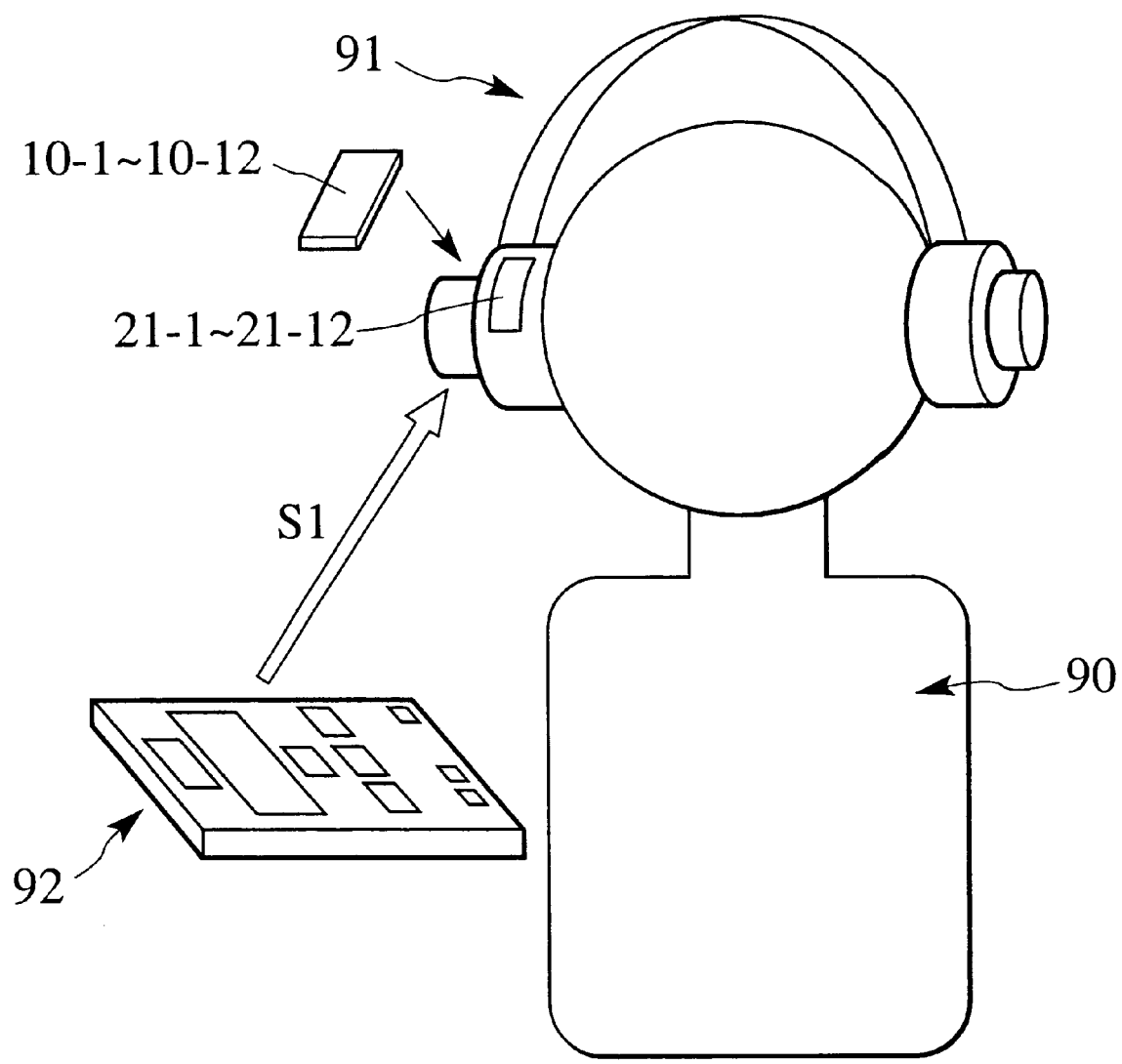
FIG. 22 is an image diagram of a sound system using the memory card and the card socket according to the present invention.

FIG. 22 is an image diagram of a sound system capable of using the memory card and the card socket of each embodiment according to the present invention described above.

This sound system comprises a headphone 91 which is put on the head of the user, and a remote controller 92 through which the user operates the remote control of the headphone 91.

The headphone 91 has the following functions:

Receiving function to receive control signals S1 of an infrared ray transmitted when the user handles the remote controller 92;

Interface function as an external interface (that is, a data input mechanism (as a connection electrode section) for inputting data from the card socket or the memory card) and a circuit, or a decode circuit for converting the input data to data of a desired data type) comprising each card socket 21-1 to 21-12 into which each memory card 10-1 to 10-12 is inserted and then set;

Demodulating function to demodulate audio signals such as music information and the like stored in the memory card; and Audio output function to output the demodulated audio signals as sounds.

The remote controller 92 has a plurality of operation buttons to control the operation of the headphone 91, and a transmission function to transmit the control signals S1 of infrared ray to the headphone 91 when one or more operation buttons are pushed.

When the memory card 10-1 to 10-12 and the card socket 21-1 to 21-12 are applied to the sound system having the configuration described above, it is unnecessary for the user to hold the headphone 91 by the disengaged hand during the insertion of the memory card to and the removal of it from the card socket. That is, the user can perform the insertion and removal of the memory card smoothly.

In addition, the memory card and the card socket of the present invention can be applied to all following devices using memory cards: Portable audio devices; portable telephones; digital cameras; digital video cameras; memory card drives (incorporated in desktop personal computers, notebook-sized personal computers, palm-sized personal computers and the like); digital electronic music instruments; digital television sets; telephone/facsimile devices; digital broadcasting receivers (as set-top boxes); and the like.

Further, the memory card and the card socket of the present invention can also be applied to various systems, in addition to semiconductor memory cards, in which a memory recording medium is inserted and then set in a socket. This recording medium is small-sized optical discs and small-sized discs, for example. These systems are products, and in each product a small-sized hard disk drive is packaged in its housing made of a magnet shield material, and the shape of the product is equal to that of the memory card, and whose interface is also compatible with that of the memory card.

As set forth in detail, according to the present invention, it is possible to operate the insertion and removal of the memory card to the card socket smoothly. In particularly, even if a main device to which the card socket is attached is a headphone of a relatively light in weight, it is for the user to insert the memory card to and remove it from the card socket easily without any holding the main device by the disengaged hand.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A card socket comprising:
    a socket body in which a memory card is set and a bottom surface thereof has a hole section;
    socket electrodes formed on the bottom surface of the socket body to be electrically contacted to exposed electrodes of the memory card when the memory card is set into the card socket; and
    a fixed card releasing mechanism having a push member for releasing the memory card in a fixed state from the socket body by pushing up the push member into the hole section,
    wherein at least a part of the bottom surface of at least one of the socket body and the socket electrodes are made of ferromagnetic material.

2. The card socket according to claim 1, wherein the ferromagnetic material is made of a permanent magnet, and the permanent magnet is covered with a magnet shield material.

3. The card socket according to claim 1, wherein the socket electrodes are formed on the bottom surface of the socket body in an exposed state, and the socket electrodes act as spring electrodes against the exposed electrodes of the memory card when the memory card is set in the card socket completely.

4. The card socket according to claim 1, wherein a shape of the socket body is one of a box having an inlet section at one side and a box having an inlet section at one side in which a part of one upper surface of the socket body is an opening shaped.

5. The card socket according to claim 1, wherein the card socket is mounted as an external interface into a sound system and the socket electrodes in the card socket are electrically connected to a data input mechanism of the sound system for inputting data from the memory card.

6. The card socket according to claim 1, wherein the memory card comprises:
    a card shaped holder; and
    a memory device module embedded in the card shaped holder comprising a semiconductor memory device whose external electrodes are exposed on one surface of the memory device module, and wherein at least one part of the card shaped holder and the external electrodes are made of a ferromagnetic material.

7. The card socket according to claim 6, wherein the ferromagnetic material is made up of a permanent magnet, and the permanent magnet is covered with a magnetic shield material.

8. The card socket according to claim 6, wherein the ferromagnetic material is adhered on a part of the card shaped holder.

9. A card socket comprising:

a socket body in which a memory card is set and a bottom surface thereof has a hole section;

socket electrodes formed on the bottom surface of the socket body to be electrically contacted to exposed electrodes of the memory card when the memory card is set into the card socket; and a fixed card releasing mechanism having a push member for releasing the memory card in a fixed state from the socket body by pushing up the push member into the hole section;

wherein at least a part of a bottom surface of at least one of the socket body and the socket electrodes are made of an electromagnet.

10. The card socket according to claim 9, wherein the electromagnet is covered with a magnet shield material.

11. The card socket according to claim 9, wherein the memory card comprises:

a card shaped holder; and a memory device module embedded in the card shaped holder comprising a semiconductor memory device whose external electrodes are exposed on one surface of the memory device module, and wherein at least one part of the card shaped holder and the external electrodes are made of an electromagnet.

12. A card socket comprising:

a socket body in which a memory card is set and a bottom surface thereof has a hole section;

socket electrodes formed on the bottom surface of the socket body to be electrically contacted to exposed electrodes of the memory card when the memory card is set into the card socket; and a fixed card releasing mechanism having a push member for releasing the memory card in a fixed state from the socket body by pushing up the push member into the hole section, wherein the memory card is strongly contacted and fixed to the bottom surface of the socket body by a magnetic force.

13. The card socket according to claim 11, wherein the electromagnet is covered with a magnet shield material.

14. The card socket according to claim 12, wherein the memory card is the memory card as claimed in claim 12.

15. The card socket according to claim 12, further comprising a fixed card releasing mechanism including a plastic member of a low permeability for releasing the memory card in a magnetically fixed state from the card socket by inserting the plastic member.

16. The card socket according to claim 12, further comprising a fixed card releasing mechanism including a member of a magnetic shield function for releasing the memory card in a magnetically fixed state from the card socket by inserting the member.

17. The card socket according to claim 12, wherein a magnet force between the socket body and the memory card has a value by which the memory card is automatically inserted into the socket body without another additional force when the memory card in near to an inlet section of the socket body.

* * * * *

UNITED STATES PATENT AND TRADEMARK OFFICE
CERTIFICATE OF CORRECTION

PATENT NO. : 6,471,131 B2
DATED : October 29, 2002
INVENTOR(S) : Okada et al.

It is certified that error appears in the above-identified patent and that said Letters Patent is hereby corrected as shown below:

<u>Title page,</u>
Item [30], Foreign Application Priority Data, should read:
--     [30]     Foreign Application Priority Data

Mar. 2, 2000   (JP) ............................ 2000-057713
    Feb. 16, 2001  (JP) ............................ 2001-040099 --

Signed and Sealed this

First Day of April, 2003

JAMES E. ROGAN
*Director of the United States Patent and Trademark Office*